(12) United States Patent
Tamareselvy et al.

(10) Patent No.: US 8,293,845 B2
(45) Date of Patent: Oct. 23, 2012

(54) IRRITATION MITIGATING POLYMERS AND USES THEREFOR

(76) Inventors: Krishnan Tamareselvy, Brecksville, OH (US); William F. Masler, III, Medina, OH (US); Deborah S. Filla, Twinsburg, OH (US); Gary Gray, Avon Lake, OH (US)

( * ) Notice: Subject to any disclaimer, the term of this patent is extended or adjusted under 35 U.S.C. 154(b) by 1150 days.

(21) Appl. No.: 11/937,671

(22) Filed: Nov. 9, 2007

(65) Prior Publication Data
US 2008/0113895 A1 May 15, 2008

Related U.S. Application Data

(60) Provisional application No. 60/864,989, filed on Nov. 9, 2006.

(51) Int. Cl.
*C08F 220/06* (2006.01)
*C08F 8/44* (2006.01)

(52) U.S. Cl. ............... 525/330.2; 525/329.5; 525/329.7; 525/330.3; 510/361; 510/434; 510/476; 510/477

(58) Field of Classification Search ............... 525/330.2, 525/329.5, 329.7, 330.3; 510/361, 434, 476, 510/477
See application file for complete search history.

(56) References Cited

U.S. PATENT DOCUMENTS

| | | | |
|---|---|---|---|
| 2,923,692 A | 2/1960 | Ackerman et al. |
| 3,929,678 A | 12/1975 | Laughlin et al. |
| 4,132,678 A | 1/1979 | Iijima et al. |
| 4,565,647 A | 1/1986 | Llenado |
| 4,726,915 A | 2/1988 | Verdicchio |
| 5,349,030 A | 9/1994 | Long, II et al. |
| 5,373,044 A | 12/1994 | Adams et al. |
| 5,456,849 A | 10/1995 | Houghton et al. |
| 5,720,964 A | 2/1998 | Murray |
| 5,858,948 A | 1/1999 | Ghosh et al. |
| 6,051,541 A | 4/2000 | Neuser et al. |
| 6,433,061 B1 | 8/2002 | Marchant et al. |
| 7,084,104 B2 | 8/2006 | Martin et al. |
| 7,098,180 B2 | 8/2006 | Ganopolsky et al. |
| 7,115,550 B2 | 10/2006 | Szewczyk |

FOREIGN PATENT DOCUMENTS

| | | |
|---|---|---|
| WO | 99/21530 | 5/1999 |
| WO | 2005/023970 | 3/2005 |

OTHER PUBLICATIONS

Eghbali et al., Langmuir 22 (2006) 4766-4776.*
Todd and Byers, Volatile Silicone Fluids for Cosmetic Formulations, Cosmetics and Toiletries, vol. 91, Jan. 1976, pp. 29-32.
Technical Data Sheet TDS-187, Noveon Consumers Specialties of Lubrizol Advanced Materials, Inc., Jan. 2002.
Technical Data Sheet TDS-244, Noveon Consumers Specialties of Lubrizol Advanced Materials, Inc., Jan. 2002.
Technical Data Sheet TDS-294, Noveon Consumers Specialties of Lubrizol Advanced Materials, Inc., Jul. 2003 / Jun. 2006 / Jul. 2007.
Nicolas Gaillard et al., Synthesis and characterization of block-co-polymer surfactants with specific interactions with associative thickeners, Progress in Organic Coatings 57 (2006) 98-109.

* cited by examiner

*Primary Examiner* — Roberto Rabago
(74) *Attorney, Agent, or Firm* — Thoburn T. Dunlap

(57) ABSTRACT

A method for increasing the efficacy of hydrophobically modified (meth)acrylic based polymers to increase the critical micelle concentration of a surfactant composition by attenuating the degree of neutralization (DN) of the polymer is disclosed.

16 Claims, 4 Drawing Sheets

IRRITATION MITIGATING POLYMERS AND USES THEREFOR

CROSS-REFERENCE TO RELATED APPLICATION

This application claims priority to U.S. provisional application Ser. No. 60/864,989, filed on Nov. 9, 2006.

FIELD OF THE INVENTION

In one aspect, the present invention relates to non-crosslinked, linear acrylic copolymers of low molecular weight and their use as ocular and/or dermal irritation mitigants in surfactant containing compositions. Exemplary embodiments of the invention relate to reduced irritation personal care cleansing compositions, reduced irritation household care cleaning compositions, and reduced irritation industrial and institutional care cleaning compositions that contain a surfactant or surfactants in combination with a non-crosslinked, linear, low molecular weight acrylic copolymer.

BACKGROUND

Surfactants are widely used in aqueous based personal care, household care and industrial and institutional care formulations as wetting agents, detergents, and emulsifiers. In personal care cleansing products (e.g., shampoos, body washes, facial cleansers, liquid hand soaps, etc.), household care cleaning products (e.g., hard surface cleaners, laundry detergents, dish soaps, automatic dish washer detergents, shower cleansers, bathroom cleansers, car wash detergents, etc.) and industrial and institutional care cleaners (high strength cleaners, detergents, etc.) the surfactant package is one of the most important components in the detersive formulation. These compositions generally comprise a mixture of one or more surfactants as the active detersive ingredient. The surfactant: 1) improves the wettability of the soiled substrate; 2) loosens soil from the substrate; and 3) emulsifies, solubilizes and/or suspends the loosened soil particles in the aqueous wash medium.

Although in principle any surfactant class (e.g., cationic, anionic, nonionic, amphoteric) is suitable in cleansing or cleaning applications, in practice most personal care cleansers and household cleaning products are formulated with anionic surfactants or with a combination of an anionic surfactant as the primary detersive agent with one or more secondary surfactants selected from the other surfactant classes. Anionic surfactants are often used as detersive agents in cleansers and cleaning products because of their excellent cleaning and foaming properties. From the consumer's perspective, the amount and stability of the foam directly relates to the perceived cleaning efficiency of the composition. Generally speaking, the larger the volume of foam produced and the more stable the foam, the more efficient the perceived cleaning action of the composition. Exemplary anionic surfactants traditionally utilized in these formulations include alkyl sulfates and alkyl benzene sulfonates. While the anionic surfactants and in particular the anionic sulfates and sulfonates are efficient detersive agents and have large foam volume and foam stability properties, they are severe ocular irritants and are capable of causing mild to moderate dermal irritation to some sensitized persons. Accordingly, it has become more and more important to consumers that aqueous cleansing compositions are high foaming as well as mild. These combined properties are especially useful if the cleansing compositions are to be topically applied to human skin and hair. Consequently, efforts have been made to provide cleansing products, such as shampoos, bath and shower gels, and facial cleansers that have these properties. The major problem in providing such products resides in the fact that both properties tend to be mutually incompatible. While high foaming detersive surfactants are generally very harsh, mild surfactants tend to provide insufficient foaming properties.

It is known that the irritation caused by anionic sulfates can be reduced by ethoxylation. However, this reduction in irritation is accompanied by a corresponding reduction in foam volume. For example, sodium lauryl sulfate, a high foaming surfactant, causes significant eye irritation. In contrast, sodium laureth-12 sulfate (the corresponding ethoxylate containing 12 ethoxy groups) is almost completely non-irritating, but is a poor foaming agent (see Schoenberg, "Baby Shampoo," Household & Personal Products Industry 60 (September 1979)). The poor foaming properties of ethoxylated alkyl sulfates are reported in many other publications. For example, U.S. Pat. No. 4,132,678 discloses that the foaming properties of alkyl ($C_{10}$ to $C_{18}$) sulfates are drastically reduced if more than 5 ethoxy groups are added to the molecule. Additional attempts to attenuate the adverse irritant effects of anionic surfactants have been made by replacing some of the foam generating anionic surfactant with very mild secondary surfactants. The anionic surfactant is utilized in conjunction with a nonionic and/or an amphoteric surfactant as disclosed in U.S. Pat. No. 4,726,915. However, reducing the amount of anionic surfactant in a cleansing or cleaning composition adversely affects the detersive and foaming properties of the composition.

Another approach for attenuating the adverse irritant effects of anionic detersive surfactants while maintaining high cleansing and foaming properties in personal care cleansing compositions is disclosed in International Patent Application No. WO 2005/023970 to Johnson & Johnson Consumer Companies, Inc. It is disclosed that certain hydrophobically modified materials capable of binding surfactant can be combined with anionic surfactants to produce personal care compositions that exhibit relatively low ocular and/or dermal irritation and maintain relatively high foaming and foam stability properties. Disclosed hydrophobically modified materials include hydrophobically modified crosslinked acrylic copolymers that are synthesized from at least one ethylenically unsaturated carboxylic acid monomer and at least one ethylenically unsaturated hydrophobically modified monomer. The disclosure states that exemplary hydrophobically modified acrylic polymers are set forth in U.S. Pat. No. 6,433,061 to Noveon, Inc. The Johnson & Johnson disclosure additionally exemplifies polymers available under the trade names Carbopol® Aqua SF-1 and Carbopol® ETD 2020 both provided by Noveon Consumer Specialties of Lubrizol Advanced Materials, Inc. as suitable polymers for use as a surfactant binder.

It is to be noted that the polymers disclosed in U.S. Pat. No. 6,433,061 as well as the polymers identified under the Carbopol® Aqua SF-1 and ETD 2020 trade names are crosslinked. At column 5, line 32 of the '061 patent it is disclosed that the "The copolymer of the present invention desirably is crosslinked by a crosslinking monomer." Moreover, all of the polymers exemplified in the '061 patent disclosure contain a crosslinking monomer. In the trade literature Carbopol® Aqua SF-1 polymer is described in Noveon Consumer Specialties of Lubrizol Advanced Materials, Inc. Technical Data Sheet TDS-294 (July, 2003) as: " . . . a lightly crosslinked acrylic polymer dispersion designed to impart suspending, stabilizing, and thickening properties to a variety of surfactant-based personal cleansing products;" and Carbopol® ETD 2020 polymer is described in Noveon Consumer Specialties of Lubrizol Advanced Materials, Inc. Technical Data Sheet TDS-187 (January, 2002) as: "... an 'easy to disperse' crosslinked polyacrylic acid copolymer processed in a toxicologically-preferred cosolvent system." The foregoing acrylic based crosslinked polymers are non-linear, branched polymer chains which interconnect to form three dimensional network structures and have long been used in personal care applications for their rheological and structure building properties. Upon neutralization, these water soluble or dispersible polymers possess the unique ability to greatly increase the viscosity of the liquid in which they are dissolved or dispersed, even when present at concentrations considered to be quite low.

As discussed in Johnson & Johnson, supra, the applicants therein disclose a relationship between the critical micelle concentration (CMC) of an anionic surfactant in solution and the tendency of the surfactant to induce irritation. The CMC is illustrated by curve 11 in FIG. 1 of the Johnson & Johnson disclosure. As the surfactant is sequentially dosed into a container (of standardized dimension) of water the surfactant initially occupies the surface (liquid/air interface) of the water/surfactant solution. With each sequential dose of surfactant there is a concomitant reduction in the surface tension of the solution until essentially all of the interfacial surface area is filled. Continued dosing of surfactant results in the formation of micelles within the solution. The surfactant concentration at which the further addition of surfactant does not elicit any appreciable affect in solution surface tension is defined as the CMC (point 12 of curve 11). Additional surfactant added after the CMC point has been found to induce irritation. In contrast, as illustrated in curve 15 of FIG. 1, as anionic surfactant is added to an aqueous solution comprising a hydrophobically modified material, the CMC is shifted to a significantly higher surfactant concentration. Accordingly, the inclusion of hydrophobically modified crosslinked acrylic copolymers allows the use of higher concentrations of anionic surfactant in cleansing and cleaning compositions without the attendant ocular and dermal irritation effects.

Although hydrophobically modified crosslinked acrylic based copolymers have been found to mitigate ocular and dermal irritation of surfactant containing compositions, the use of such polymers can be problematic. As previously discussed, hydrophobically modified crosslinked copolymers are viscosity building agents that increase the viscosity of compositions in which they are dissolved or dispersed. As increasing amounts of viscosity builder are added to a cleansing or cleaning formulation to mitigate the adverse irritation effects of the anionic surfactant there is a corresponding increase in the viscosity of the composition. It is well known in the personal care, household care and industrial and institutional care formulation art that a liquid cleanser or cleaner should have an ideal viscosity. Indeed, viscosity allows for a controlled handling and dispensing of the product during use as compared to a thinner product. In personal care cleansing applications, a thick, rich shampoo or body cleanser is appealing to consumers from a sensory perspective. In household care applications, viscosity permits a better efficacy of the product when applied to non-horizontal surfaces such as toilet bowls, sinks, shower stalls, bath tubs, and the like. In addition, cleansing and cleaning products are expected to be easy to use. In other words, the shear thinning profile of the liquid composition should exhibit high viscosity at low shear conditions and lower viscosity at high shear conditions to aid in the application and removal of the product from the substrate to be cleaned.

However, there are some drawbacks associated with increasing the viscosity of a product beyond its ideal viscosity. Very high viscous products are typically difficult to apply and rinse away, especially if the shear thinning profile of the viscosity building agent is deficient. High viscosities can also adversely affect packaging, dispensing, dissolution, and the foaming and sensory properties of the product. Accordingly, there is a need for an irritation mitigant that does not significantly change the ideal viscosity profile of a surfactant containing composition.

DESCRIPTION OF EXEMPLARY EMBODIMENTS

Figure 1:
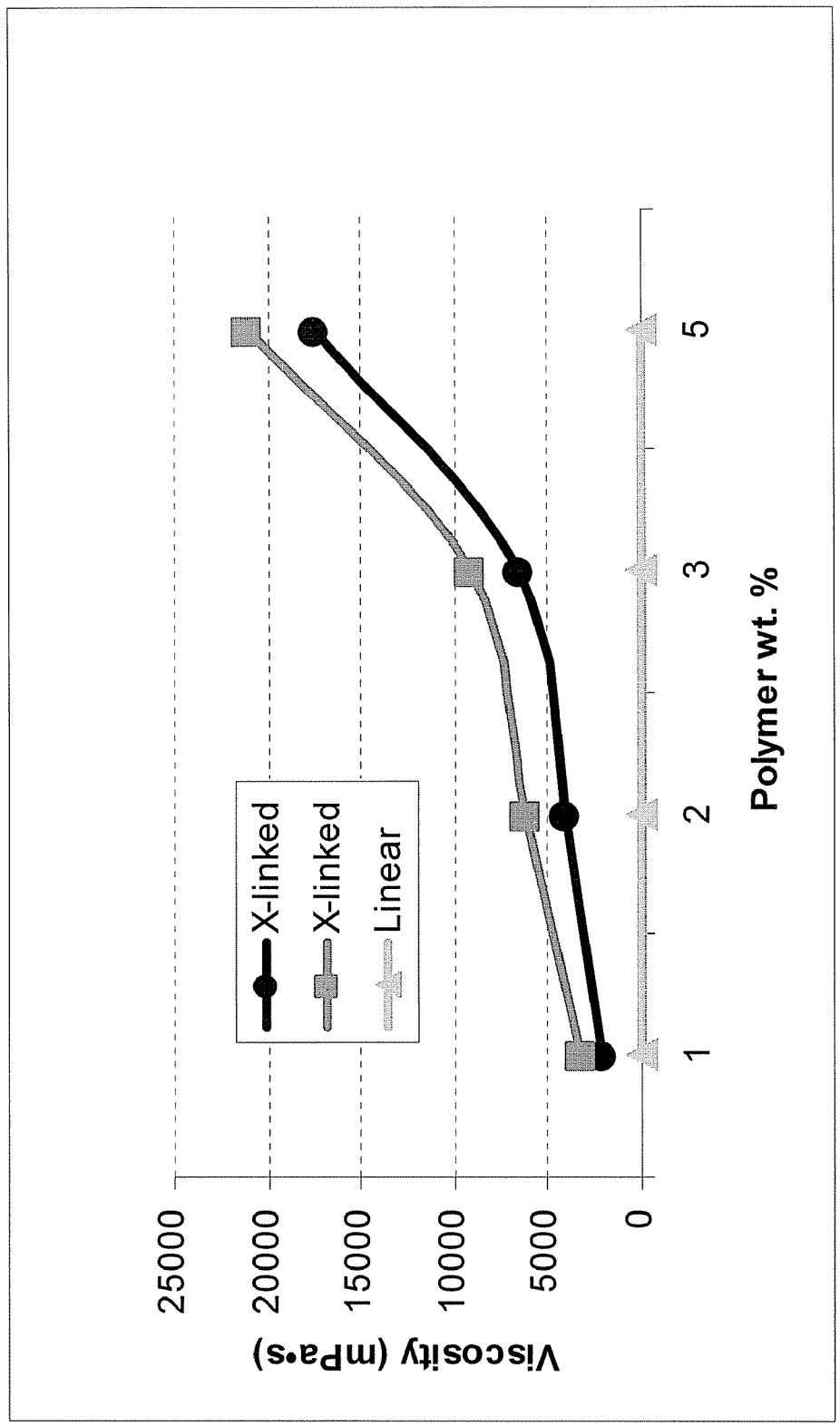
FIG. 1 is a graph of viscosity curves comparing neutralized polymer mucilages of a crosslinked acrylic based polymer and a polymer embodiment the invention.

Exemplary embodiments in accordance with the present invention are directed to a non-crosslinked, linear acrylic copolymer that mitigates the ocular and dermal irritation typically associated with surfactant containing compositions without substantially affecting the rheological properties of such surfactant containing compositions. The non-crosslinked, linear polymers are low molecular weight polymers having a number average molecular weight ($M_n$) of 100,000 or less as measured by gel permeation chromatography (GPC) calibrated with a poly(methyl methacrylate) (PMMA) standard. The copolymeric mitigant is polymerized from at least two monomeric components. The first monomeric component is selected from one or more α,β-ethylenically unsaturated monomers containing at least one carboxylic acid group. This acid group can be derived from monoacids or diacids, anhydrides of dicarboxylic acids, monoesters of diacids, and salts thereof. The second monomeric component is hydrophobically modified (relative to the first monomeric component) and is selected from one or more α,β-ethylenically unsaturated non-acid monomers containing a $C_1$ to $C_9$ alkyl group, including linear and branched $C_1$ to $C_9$ alkyl esters of (meth)acrylic acid, vinyl esters of linear and branched $C_1$ to $C_{10}$ carboxylic acids, and mixtures thereof. In one aspect of the invention the second monomeric component is represented by the formula:

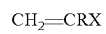

wherein R is hydrogen or methyl; X is —C(O)OR¹ or —OC(O)R²; R¹ is linear or branched $C_1$ to $C_9$ alkyl; and R² is hydrogen or linear or branched $C_1$ to $C_9$ alkyl. In another aspect of the invention $R^1$ and $R^2$ is linear or branched $C_1$ to $C_8$ alkyl and in a further aspect $R^1$ and $R^2$ are linear or branched $C_2$ to $C_5$ alkyl.

Exemplary first monomeric components include (meth) acrylic acid, itaconic acid, citraconic acid, maleic acid, fumaric acid, crotonic acid, aconitic acid, and mixtures thereof. Exemplary second monomeric components include ethyl(meth)acrylate, butyl(meth)acrylate, 2-ethylhexyl (meth)acrylate, vinyl formate, vinyl acetate, 1-methylvinyl acetate, vinyl propionate, vinyl butyrate, vinyl 2-ethylhexanoate, vinyl pivalate, vinyl neodecanoate, and mixtures thereof. As used herein, the term "(meth)acrylic" acid and "(meth)acrylate" are meant to include the corresponding methyl derivatives of acrylic acid and the corresponding alkyl acrylate. For example, "(meth)acrylic" acid refers to acrylic acid and/or methacrylic acid and "(meth)acrylate" refers to alkyl acrylate and/or alkyl methacrylate.

The non-crosslinked, linear acrylic copolymer mitigants of the invention can be synthesized via free radical polymerization techniques known in the art. In one aspect of the invention, the amount of the first monomeric component to the second monomeric component utilized ranges from about 20:80 wt. % to about 50:50 wt. %, based on the total weight of all of the monomers in the polymerization medium. In another aspect the weight ratio of the first monomeric component to the second monomeric component is about 35:65 wt. %, and in a further aspect the weight ratio of first monomeric component to second monomeric component is about 25:75 wt. %, all based on the total weight of all monomers in the polymerization medium.

In another aspect emulsion polymerization techniques can be used to synthesize the non-crosslinked, linear acrylic copolymer mitigants of the invention. In a typical emulsion polymerization, a mixture of the disclosed monomers is added with mixing agitation to a solution of emulsifying surfactant, such as, for example, an anionic surfactant (e.g., fatty alcohol sulfates or alkyl sulfonates), in a suitable amount of water, in a suitable reactor, to prepare a monomer emulsion. The emulsion is deoxygenated by any convenient method, such as by sparging with nitrogen, and then a polymerization reaction is initiated by adding a polymerization catalyst (initiator) such as sodium persulfate, or any other suitable addition polymerization catalyst, as is well known in the emulsion polymerization art. The polymerization medium is agitated until the polymerization is complete, typically for a time in the range of about 4 to about 16 hours. The monomer emulsion can be heated to a temperature in the range of about 70 to about 95° C. prior to addition of the initiator, if desired. Unreacted monomer can be eliminated by addition of more catalyst, as is well known in the emulsion polymerization art. The resulting polymer emulsion product can then be discharged from the reactor and packaged for storage or use. Optionally, the pH or other physical and chemical characteristics of the emulsion can be adjusted prior to discharge from the reactor. Typically, the product emulsion has a total solids content in the range of about 10 to about 50 wt. %. Typically, the total polymer content (polymer solids) of the product emulsion is in the range of about 15 to about 45 wt. %, generally not more than about 35 wt. %.

Suitable surfactants for facilitating emulsion polymerizations include nonionic, anionic, amphoteric, cationic surfactants, and mixtures thereof. Most commonly, nonionic surfactants, anionic surfactants, and mixtures thereof are utilized in the emulsion polymerization.

Nonionic surfactants suitable for facilitating emulsion polymerizations are well known in the polymer art, and include, without limitation, linear or branched alcohol ethoxylates, $C_8$ to $C_{12}$ alkylphenol alkoxylates, such as octylphenol ethoxylates, polyoxyethylene polyoxypropylene block copolymers, and the like. Other useful nonionic surfactants include $C_8$ to $C_{22}$ fatty acid esters of polyoxyethylene glycol, mono and diglycerides, sorbitan esters and ethoxylated sorbitan esters, $C_8$ to $C_{22}$ fatty acid glycol esters, block copolymers of ethylene oxide and propylene oxide having an HLB value of greater than about 15, ethoxylated octylphenols, and combinations thereof.

Exemplary alkylphenol alkoxylate surfactants include an octylphenol sold under the trade name IGEPAL® CA-897 by Rhodia, Inc. Exemplary linear alcohol alkoxylates include polyethylene glycol ethers of cetearyl alcohol (a mixture of cetyl and stearyl alcohols) sold under the trade names PLURAFAC® C-17, PLURAFAC® A-38 and PLURAFAC® A-39 by BASF Corp. Exemplary polyoxyethylene polyoxypropylene block copolymers include copolymers sold under the trade names PLURONIC® F127, and PLURONIC® L35 by BASF Corp.

Other Exemplary nonionic surfactants include Ethoxylated (50) linear fatty alcohols such as DISPONIL® A 5060 (Cognis), branched alkyl ethoxylates such as GENAPOL® X 1005 (Clariant Corp.), secondary $C_{12}$ to $C_{14}$ alcohol ethoxylates such as TERGITOL® S15-30 and S15-40 (Dow Chemical Co.), ethoxylated octylphenol-based surfactants such as TRITON® X-305, X-405 and X-705 (Dow Chemical Co.), IGEPAL® CA 407, 887, and 897 (Rhodia, Inc.), ICONOL® OP 3070 and 4070 (BASF Corp.), SYNPERONIC® OP 30 and 40 (Uniqema), block copolymers of ethylene oxide and propylene oxide such as PLURONIC® L35 and F127 (BASF Corp.), and secondary $C_{11}$ alcohol ethoxylates such as EMULSOGEN® EPN 407 (Clariant Corp.). Numerous other suppliers are found in the trade literature.

Anionic surfactants suitable for facilitating emulsion polymerizations are well known in the polymer art, and include sodium lauryl sulfate, sodium dodecyl benzene sulfonate, sodium dioctyl sulfosuccinate, sodium di-sec-butyl naphthylene sulfonate, disodium dodecyl diphenyl ether sulfonate, and disodium n-octadecyl sulfosuccinate, and the like.

Polymeric stabilizers (also known as protective colloids) can be utilized in the emulsion polymerization process. The polymeric stabilizers are water-soluble polymers, including, for example, synthetic polymers, such as polyvinyl alcohol, partially hydrolyzed polyvinyl acetate, polyvinylpyrrolidone, polyacrylamide, polymethacrylamide, carboxylate-functional addition polymers, polyalkyl vinyl ethers and the like; water-soluble natural polymers, such as gelatin, pectins, alginates, casein, starch, and the like; and modified natural polymers, such as methylcellulose, hydroxypropylcellulose, carboxymethylcellulose, allyl modified hydroxyethylcellulose, and the like. In some cases, it can be of advantage to use mixtures of a synthetic and a natural protective colloid, for example, a mixture of polyvinyl alcohol and casein. Further suitable natural polymers are mixed ethers such as methylhydroxyethylcellulose and carboxymethylmethylcellulose. Polymeric stabilizers can be utilized in amounts up to about 2 wt. % based on the total emulsion weight. When utilized, a polymeric stabilizer can be included in an amount in the range of about 0.0001 to about 2 wt. % in one aspect, and in another aspect from about 0.01 wt. % to about 1.0 wt. %.

Exemplary free radical initiators include, without being limited thereto, the water-soluble inorganic persulfate compounds, such as ammonium persulfate, potassium persulfate, and sodium persulfate; peroxides such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid; and oil soluble, free radical producing agents, such as 2,2'-azobisisobutyronitrile, and the like, and mixtures thereof. Peroxides and peracids can optionally be activated with reducing agents, such as sodium bisulfite or ascorbic acid, transition metals, hydrazine, sulfinic acid derivatives such as Bruggolite® FF6 which contains a mixture of the disodium salt of 2-hydroxy-2-sulfinatoacetate, the disodium salt of 2-hydroxy-2-sulfonatoacetate and sodium sulfite (commercially available from Bruggemann Chemical US), and the like. Other free-radical polymerization initiators include water soluble azo polymerization initiators, such as 2,2'-azobis(tert-alkyl) compounds having a water solubilizing substituent on the alkyl group. Additional azo polymerization catalysts include the VAZO® free-radical polymerization initiators, available from DuPont, such as VAZO® 44 (2,2'-azobis(2-(4,5-dihydroimidazolyl)propane), VAZO® 56 (2,2'-azobis(2-methylpropionamidine) dihydrochloride), and VAZO® 68 (4,4'-azobis(4-cyanovaleric acid)).

Optionally, other emulsion polymerization additives, which are well known in the emulsion polymerization art, such as solvents, buffering agents, chelating agents, inorganic electrolytes, chain terminators, and pH adjusting agents can be included in the polymerization system.

A general emulsion polymerization procedure for the preparation of the non-crosslinked, linear acrylic copolymer mitigants of the present invention is exemplified herein.

In one aspect, the number average molecular weight ($M_n$) of the linear copolymeric mitigants of the present invention as measured by gel permeation chromatography (GPC) calibrated with a poly(methyl methacrylate) (PMMA) standard is 100,000 or less. In another aspect of the invention, the molecular weight ranges between about 5,000 and about 80,000 $M_n$, in a further aspect between about 10,000 and 50,000 $M_n$, and in a still further aspect between about 15,000 and 40,000 $M_n$.

In one aspect of the invention, the linear copolymeric mitigants have a viscosity of 500 mPa·s or less (Brookfield RVT, 20 rpm, spindle No. 1) at a 5 wt. % polymer solids concentration in deionized water and neutralized to pH 7 with an 18 wt. % NaOH solution. In another aspect the viscosity ranges from about 1 to about 500 mPa·s, from about 10 to about 250 mPa·s in a further aspect, and from about 15 to about 150 mPa·s in a still further aspect. In another aspect of the invention, a 3 wt % mucilage of the linear hydrophobically modified (meth)acrylic polymer in deionized water neutralized with an 18% solution of NaOH to about pH 7 has a yield value of 0 and a Brookfield viscosity of less than 1000 mPa·s (Brookfield RVT, 20 rpm, spindle No. 1) at a temperature range of 20 to 25° C.

The non-crosslinked, linear acrylic based copolymers can be utilized in the unneutralized state or can be neutralized to a desired degree of neutralization with a suitable alkaline neutralizing agent. The amount of alkaline neutralizing agent employed to obtain a desired degree of neutralization is calculated on the basis of the acid number of the polymer. Exemplary neutralizing agents include sodium hydroxide, potassium hydroxide, triethanolamine, fatty acid amines, and the like. Alternatively, other alkaline materials can be used, such as, for example, pre-neutralized surfactants. In one aspect, the degree of polymer neutralization is 100% or less, in another aspect the degree of polymer neutralization is 80% or less, in still another aspect the degree of polymer neutralization is 60% or less. In a further aspect, the degree of neutralization is 50% or less. In a still further aspect, the degree of neutralization is 40, 30, and 20% or less. In another aspect, the degree of polymer neutralization can range from about 0% or 1% to about 100%, in still another aspect from about 0% or 1% to about 80%, in a further aspect from about 0% or 1% to about 60%, in a still further aspect from about 5% to about 40%, and in another aspect from about 10% to about 35%, and in a further aspect from about 15% to about 30%.

Unexpectantly, it has been found that the efficacy of hydrophobically modified (meth)acrylic based polymers (including the non-crosslinked, linear acrylic copolymers of the invention) to increase the CMC of a surfactant composition can be optimized by attenuating the degree of neutralization (DN) of the polymer, wherein the acid groups carried by the polymer are neutralized by a suitable neutralizing agent, such as a base, to a desired degree of neutralization. Typically, crosslinked (meth)acrylic based hydrophobically modified copolymers such as Carbopol® Aqua SF-1 and Carbopol® ETD 2020 rheology modifiers are neutralized to pH 7.0 in order to achieve optimal viscosity build. This equates to a DN of about 80%. By attenuating the degree of neutralization to DN values below about 80% the CMC of a surfactant containing composition can be increased. In a further aspect the DN value can range from about 0% or 1% to about 60%, in a still further aspect from about 5% to about 40%, and in another aspect from about 10% to about 35%, and in a further aspect from about 15% to about 30%.

The neutralization attenuation phenomenon also has been found to work for higher molecular weight crosslinked and non-crosslinked hydrophobically modified (meth)acrylic based polymers. Such polymers can be polymerized from a monomer composition comprising at least one monounsaturated carboxylic acid containing monomer and at least one hydrophobically modified, ethylenically unsaturated comonomer. The "monounsaturated carboxylic acid" containing monomer contains at least one carboxyl group meaning that the monounsaturated carboxylic acid can be a monocarboxylic acid or a polycarboxylic acid. As used herein the term "monounsaturated carboxylic acid" also includes monounsaturated acid anhydrides wherein the acid anhydride group is formed by the elimination of one molecule of water from two carboxyl groups located on the same carboxylic acid molecule. Suitable examples of monounsaturated carboxylic acid containing monomers include but are not limited to (meth)acrylic acid, ethacrylic acid, itaconic acid, citraconic acid, mesaconic acid, glutaconic acid, fumaric acid, crotonic acid, maleic acid, aconitic acid, and mixtures thereof. Suitable examples of monounsaturated acid anhydrides include but are not limited to maleic anhydride, itaconic anhydride, citraconic anhydride, and mixtures thereof. Moreover, half esters of the monounsaturated polycarboxylic acids and the anhydrides thereof, such as maleic acid, fumaric acid, itaconic acid, aconitic acid, maleic anhydride, itaconic anhydride, citraconic anhydride esterified with $C_1$ to $C_{30}$ alkanols can also be used. The monounsaturated carboxylic acid containing monomer can be present in the polymerizable monomer composition in an amount ranging from about 10 to about 98% by weight in one aspect, from 15 to about 95% by weight in another aspect, and from about 20 to 90% by weight in a further aspect, based upon the total weight of the hydrophobic monomers and the monounsaturated carboxylic acid containing monomer in the mixture.

The hydrophobically modified, ethylenically unsaturated monomer can be selected from (meth)acrylates, (meth)acrylamides, hydrophobically modified associative monomers, and combinations thereof. In one aspect, (meth)acrylates and (meth)acrylamides are represented by the formula:

(I)

wherein R represents hydrogen, methyl or ethyl; X represents oxygen or NH; and $R^1$ represents a $C_1$ to $C_{30}$ alkyl, $C_5$ to $C_8$ cycloalkyl, aryl. When X is oxygen, the polymerizable monomer composition contains a crosslinking monomer described below. The alkyl group can be linear or branched and can contain one or more $C_1$ to $C_{10}$ alkoxy substituents. Representative (meth)acrylate monomers include but are not limited to methyl(meth)acrylate, ethyl(meth)acrylate, n-propyl(meth)acrylate, isopropyl(meth)acrylate, n-pentyl(meth)acrylate, n-butyl(meth)acrylate, isobutyl(meth)acrylate, 2-methylpentyl(meth)acrylate, n-hexyl(meth)acrylate, n-octyl(meth)acrylate, 2-ethylhexyl(meth)acrylate, n-decyl(meth)acrylate, n-dodecyl(meth)acrylate, n-hexadecyl(meth)acrylate, stearyl (meth)acrylate, n-octadecyl(meth)acrylate, behenyl(meth)acrylate, hydroxyethyl(meth)acrylate, hydroxypropyl(meth)acrylate, methoxymethyl(meth)acrylate, methoxyethyl (meth)acrylate, ethoxyethyl(meth)acrylate, butoxyethyl (meth)acrylate, ethoxypropyl(meth)acrylate, cyclohexyl (meth)acrylate, and mixtures thereof. Representative (meth)acrylamide monomers include but are not limited to (meth)acrylamide, N-t-butyl(meth)acrylamide, N-methyl(meth)acrylamide, N-ethyl(meth)acrylamide, behenyl(meth)acrylamide, dodecyl(meth)acrylamide, hexadecyl(meth)acrylamide, and mixtures thereof.

The hydrophobically modified associative monomers are represented by the formula:

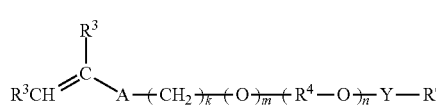

(II)

wherein, each $R^3$ is independently represents hydrogen, methyl, —C(O)OH, and —C(O)$OR^5$; $R^5$ is $C_1$ to $C_{30}$ alkyl; A is —$CH_2C(O)O$—, —C(O)O—, —O—, —$CH_2O$—, —NHC(O)NH—, —C(O)NH—, —Ar—$(CE_2)_z$-NHC(O)O—, —Ar—$(CE_2)_z$-NHC(O)NH—, and —$CH_2CH_2NHC(O)$—; Ar is a divalent aryl; E is H or methyl; z is 0 or 1; k is an integer in the range of 0 to about 30, and m is 0 or 1, with the proviso that when k is 0, m is 0, and when k is in the range of 1 to about 30, m is 1; $(R^4$—$O)_n$ is a polyoxyalkylene, which is a homopolymer, a random copolymer, or a block copolymer of $C_2$ to $C_4$ oxyalkylene units, wherein $R^4$ is —$C_2H_4$—, —$C_3H_6$—, —$C_4H_8$—, and n is an integer in the range of about 5 to about 250, Y is —$R^4O$—, —$R^4NH$—, —C(O)—, —C(O)NH—, —$R^4NHC(O)NH$—, or —C(O)NHC(O)—; and $R^6$ is a substituted or unsubstituted alkyl selected from a $C_8$ to $C_{40}$ linear alkyl, a $C_8$ to $C_{40}$ branched alkyl, a $C_8$ to $C_{40}$ carbocyclic alkyl, a $C_2$ to $C_{40}$ alkyl-substituted phenyl, an aryl-substituted $C_2$ to $C_{40}$ alkyl, wherein the $R^6$ alkyl group optionally is substituted with one or more substituents selected from a hydroxyl group, an alkoxyl group, and a halogen group; $R^5$ can be selected from the residue of a polycyclic hydrocarbyl compound such as, for example, lanolin or cholesterol and residues of seed oils such as, for example, hydrogenated castor seed oil. Representative associative monomers include but are not limited to cetyl polyethoxylated methacrylate, cetearyl polyethoxylated(meth)acrylate, stearyl polyethoxylated(meth)acrylate, arachidyl polyethoxylated(meth)acrylate, behenyl polyethoxylated (meth)acrylate, cerotyl polyethoxylated(meth)acrylate, montanyl polyethoxylated(meth)acrylate, melissyl polyethoxylated(meth)acrylate, lacceryl polyethoxylated(meth)acrylate, tristyrylphenol polyethoxylated(meth)acrylate, nonyl phenol polyethoxylated(meth)acrylate, hydrogenated castor oil polyethoxylated(meth)acrylate, canola polyethoxylated(meth)acrylate, and cholesterol polyethoxylated (meth)acrylate, where the polyethoxylated portion of the monomer comprises about 5 to about 100, preferably about 10 to about 80, and more preferably about 15 to about 60 ethylene oxide repeating units. The hydrophobic comonomer can be present in the polymerizable monomer composition in an amount ranging from about 2 to about 90% by weight in one aspect, from 3 to about 80% by weight in another aspect, and from about 5 to 76% by weight in a further aspect, based upon the total weight of the hydrophobic monomers and the monounsaturated carboxylic acid containing monomer in the mixture.

Optionally, the polymerizable monomer composition can contain one or more nonionic, cationic, anionic and amphoteric or zwitterionic monomers. Examples of nonionic monomers include various hydroxyalkyl(meth)acrylates where the alkyl portion has 1 to 10 carbon atoms such as hydroxyethyl (meth)acrylate; allyl ethers of linear and branched $C_1$ to $C_9$ alkanols, allyl esters of $C_1$ to $C_9$ linear and branched alkanols, acrylamide; vinyl alcohol; n-vinylpyrrolidone, 1-hydroxypropyl methacrylate, 2-hydroxypropyl methacrylate, including mixtures thereof. Illustrative cationic monomers can include but are not limited to diallyldimethylammonium chloride, diallyldiethylammonium chloride, diethylaminoethyl methacrylate, dimethylaminoethyl methacrylate, methacryloyloxyethyltrimethylammonium sulfate, methacryloyloxyethyltrimethylammonium chloride, 3-(methacrylamido) propyltrimethylammonium chloride, and mixtures thereof. Illustrative anionic monomers include but are not limited to p-styrene sulfonic acids, vinyl sulfonic acid, 2-acrylamido-2-methylpropane sulfonic acid, and mixtures thereof. Illustrative amphoteric or zwitterionic monomers include but are not limited to 3-(2-acrylamido-2-methylpropyldimethylammonio)-1-propanesulfonate, co-N,N-dimethyl-N-methacroylamidoproplyammoniopropanesulfonate, N-vinylpyrrolidone-co-2-vinylpyridiniopropanesulfonate, and mixtures thereof. The one or more nonionic, cationic, anionic and amphoteric or zwitterionic monomers if utilized can be present in an amount from about 0.1 to about 15 parts by weight per 100 parts by weight, based upon the total weight of the polymerizable monomers in the mixture.

The optional crosslinking monomers include, for example, allyl ethers of sucrose or of pentaerythritol, or similar compounds, diallyl esters, dimethallyl ethers, allyl or methallyl acrylates and acrylamides, tetraallyl tin, tetravinyl silane, polyalkenyl methanes, diacrylates and dimethacrylates, divinyl compounds such as divinyl benzene, divinyl glycol, polyallyl phosphate, diallyloxy compounds, phosphite esters, and the like. Typical of such polyunsaturated monomers are di, tri, or tetra, penta, or hexa-allyl sucrose; di, tri, or tetra-allyl pentaerythritol; diallylphthalate, diallyl itaconate, diallyl fumarate, diallylmaleate, divinylbenzene, allylmethacrylate, allyl citrate, ethylene glycol di(meth)acrylate, trimethylolpropane tri(meth)acrylate, 1,6-hexanediol di(meth)acrylate, pentaerythritol tri(meth)acrylate, tetramethylene glycol di(meth)acrylate, tetramethylene glycol diacrylate, ethylene glycol diacrylate, ethylene glycol dimethacrylate, triethylene glycol di(meth)acrylate, trimethylolpropane ethoxylated (15) tri(meth)acrylate, methylene bisacrylamide, and the like. Castor oils or polyols, esterified with ethylenically unsaturated carboxylic acid and the like can also be used. The crosslinking monomer can be used in an amount from about 0.005 to about 10 parts by weight in one aspect, from about 0.01 to about 5.0 parts by weight in another aspect, and from about 0.05 to about 2.5 parts by weight in a further aspect based upon 100 parts by weight of all of the unsaturated acid and the hydrophobically modified comonomers in the polymerizable monomer composition.

A steric stabilizer can optionally be included in the copolymer composition. Various steric stabilizers can be utilized, including triblock copolymers of stearyl esters. The steric stabilizers have a hydrophilic group and a hydrophobic group and are generally block copolymers comprising a soluble block and an anchor block having a molecular weight (i.e., chain length) usually well above 1000, but a hydrophobe length of more than 50 Angstroms. When the steric stabilizer is a linear block copolymer, it is defined by the formula ABA where A is a hydrophilic moiety having a molecular weight of from about 300 to about 60,000 and a solubility of less than 1% in water at 25° C. When the steric stabilizer is a random copolymeric comb steric stabilizer, it is defined by the formula:

where $R_9$ is a terminating group and can be the same or different and will be different from Z and Q, Z is a hydrophobic moiety having a solubility of less than 1% in water at 25° C., Q is a hydrophilic moiety having a solubility of more than 1% in water at 25° C., and m and n are integers of 1 or more, and are selected such that the molecular weight (Mn) of the polymer is from about 100 to about 250,000. Such steric stabilizers are described in U.S. Pat. Nos. 5,373,044 and 5,349,030, which are hereby incorporated by reference. In one aspect, steric stabilizers of the present invention include dimethicone copolyols, dimethicone copolyol esters, and dimethicone copolyol phthalate available under the Pecosil® trade name distributed by Phoenix Chemical. Linear block copolymers defined above by the formula ABA are available under the Hypermer trade name (e.g., Hypermer B-246) from Uniquema. When the optional steric stabilizer is present, the monomer mixture will usually contain from about 0.1 to about 10 parts by weight per 100 parts by weight of the monounsaturated acid and the hydrophobic comonomers in the mixture.

Polymerization of the monomer composition can be carried out in the presence of a free radical initiator and polymerized via conventional dispersion, precipitation or emulsion polymerization techniques known to the art. In one aspect of the invention the monomer composition is polymerized via the emulsion polymerization wherein the polymerization method and polymerization components are described above for the low molecular weight linear polymer embodiment. The molecular weights of the polymers of this embodiment range from 100,000 $M_w$ and higher, and can range up to 5,000,000 to 10,000,000 or more.

The degree of neutralization, neutralizing agents and procedures described above for the low molecular weight linear polymers also apply for the higher molecular weight crosslinked and non-crosslinked hydrophobically modified (meth)acrylic based polymers described herein.

The non-crosslinked, linear acrylic copolymer of the invention can be utilized to mitigate ocular and/or dermal irritation caused by surfactants, particularly anionic surfactants. The copolymeric mitigant of the invention can be combined with any surfactant utilized in personal care cleansing, animal care cleansing, pet care cleansing, household care cleaning, and industrial and institutional care cleaning compositions. The surfactant can be selected from anionic, cationic, nonionic, amphoteric, zwitterionic, and combinations of these surfactants. According to certain aspects of the invention, the non-crosslinked, linear copolymeric mitigant is combined with anionic detersive surfactants typically contained in personal and household care cleansers and cleaner compositions. Exemplary personal care cleansers include but are not limited to shampoos (e.g., 2-in-1 shampoos, conditioning shampoos, bodifying shampoos; moisturizing shampoos, temporary hair color shampoos, 3-in-1 shampoos, anti-dandruff shampoos, hair color maintenance shampoos, acid (neutralizing) shampoos, salicylic acid shampoos, medicated shampoos, baby shampoos, and the like), and skin and body cleansers (e.g., moisturizing body washes, antibacterial body washes; bath gels, shower gels, liquid hand soaps, bar soaps, body scrubs, bubble baths, facial scrubs, foot scrubs, and the like). Exemplary household care cleaners include but are not limited to home care and industrial and institutional applications (e.g., laundry detergents, dishwashing detergents (automatic and manual), hard surface cleaners, heavy duty hand soaps, cleaners and sanitizers, automotive cleaners, and the like). Exemplary pet and animal care cleansers include but are not limited to shampoos, medicated shampoos, conditioning shampoos (e.g., detangling, antistatic, grooming), and foaming shampoos.

The irritation mitigated compositions contain various surfactants such as anionic, amphoteric, zwitterionic, nonionic, cationic, or combinations thereof.

The anionic surfactant can be any of the anionic surfactants known or previously used in the art of aqueous surfactant compositions. Suitable anionic surfactants include but are not limited to alkyl sulfates, alkyl ether sulfates, alkyl ether sulfonates, alkaryl sulfonates, alkyl succinates, alkyl sulfosuccinates, N-alkoyl sarcosinates, alkyl phosphates, alkyl ether phosphates, alkyl ether carboxylates, alkylamino acids, alkyl peptides, alkoyl taurates, carboxylic acids, acyl and alkyl glutamates, alkyl isethionates, and alpha-olefin sulfonates, especially their sodium, potassium, magnesium, ammonium and mono-, di- and triethanolamine salts. The alkyl groups generally contain from 6 to 26 carbon atoms and can be unsaturated. The aryl groups generally contain 6 to 14 carbon atoms. The alkyl ether sulfates, alkyl ether sulfonates, alkyl ether phosphates and alkyl ether carboxylates can contain from 1 to 25 ethylene oxide and/or propylene oxide units per molecule in one aspect, and from 1 to 10 ethylene oxide and/or propylene oxide units per molecule in another aspect. In one aspect, the alkaryl sulfonate is alkyl benzene sulfonate and salts thereof (e.g., sodium, potassium, magnesium, etc.) wherein the alkyl group contains 8 to 16 carbon atoms. In another aspect, the alkaryl sulfonate is dodecyl benzene sulfonate and salts thereof (e.g., sodium, potassium, magnesium, etc.). Other surfactants are disclosed in U.S. Pat. No. 6,051,541 which is herein incorporated by reference.

Examples of suitable anionic surfactants include sodium and ammonium lauryl ether sulfate (with 1, 2, and 3 moles of ethylene oxide), sodium, ammonium, and triethanolamine lauryl sulfate, disodium laureth sulfosuccinate, sodium cocoyl isethionate, sodium $C_{12}$ to $C_{14}$ olefin sulfonate, sodium laureth-6 carboxylate, sodium $C_{12}$ to $C_{15}$ pareth sulfate, sodium methyl cocoyl taurate, sodium dodecylbenzene sulfonate, sodium cocoyl sarcosinate, triethanolamine monolauryl phosphate, and fatty acid soaps.

The nonionic surfactant can be any of the nonionic surfactants known or previously used in the art of aqueous surfactant compositions. Suitable nonionic surfactants include but are not limited to aliphatic $C_6$ to $C_{18}$ primary or secondary linear or branched chain acids, alcohols or phenols, linear alcohol and alkyl phenol alkoxylates (especially ethoxylates and mixed ethoxy/propoxy), block alkylene oxide condensate of alkyl phenols, alkylene oxide condensates of alkanols, ethylene oxide/propylene oxide block copolymers, semi-polar nonionics (e.g., amine oxides and phosphine oxides), as well as alkyl amine oxides. Other suitable nonionics include mono or di alkyl alkanolamides and alkyl polysaccharides, sorbitan fatty acid esters, polyoxyethylene sorbitan fatty acid esters, polyoxyethylene sorbitol esters, and polyoxyethylene acids. Examples of suitable nonionic surfactants include coco mono- or diethanolamide, coco diglucoside, alkyl polyglucoside, cocamidopropyl and lauramine oxide, polysorbate 20, ethoxylated linear alcohols, cetearyl alcohol, lanolin alcohol, stearic acid, glyceryl stearate, PEG-100 stearate, and oleth 20.

In one aspect, the nonionic surfactant is an alcohol alkoxylate wherein the alcohol residue contains 8 to 18 carbon atoms and the number of moles of alkylene oxide is from about 3 to about 12. The alkylene oxide moiety is selected from ethylene oxide, propylene oxide and combinations thereof. In another aspect, the alcohol alkoxylate can be derived from a fatty alcohol containing 8 to 15 carbon atoms and can contain from 5 to 10 alkoxy groups (e.g. ethylene oxide, propylene oxide, and combinations thereof). Exemplary nonionic alcohol alkoxylate surfactants in which the alcohol residue contains 12 to 15 carbon atoms and contain about 7 ethylene oxide groups are available under the Tomadol® (e.g., product designation 25-7) and Neodol® (e.g., product designation 25-7) trade names from Tomah Products, Inc. and Shell Chemicals, respectively.

Another commercially available alcohol alkoxylate surfactant is sold under the Plurafac® trade name from BASF. The Plurafac surfactants are reaction products of a higher linear alcohol and a mixture of ethylene and propylene oxides, containing a mixed chain of ethylene oxide and propylene oxide, terminated by a hydroxyl group. Examples include $C_{13}$ to $C_{15}$ fatty alcohols condensed with 6 moles ethylene oxide and 3 moles propylene oxide, $C_{13}$ to $C_{15}$ fatty alcohols condensed with 7 moles propylene oxide and 4 moles ethylene oxide, and $C_{13}$ to $C_{15}$ fatty alcohols condensed with 5 moles propylene oxide and 10 moles ethylene oxide.

Another commercially suitable nonionic surfactant is available from Shell Chemicals under the Dobanol™ trade name (product designations 91-5 and 25-7). Product designation 91-5 is an ethoxylated $C_9$ to $C_{11}$ fatty alcohol with an average of 5 moles ethylene oxide and product designation 25-7 is an ethoxylated $C_{12}$ to $C_{15}$ fatty alcohol with an average of 7 moles ethylene oxide per mole of fatty alcohol.

Amphoteric and zwitterionic surfactants are those compounds which have the capacity of behaving either as an acid or a base. These surfactants can be any of the surfactants known or previously used in the art of aqueous surfactant compositions. Suitable materials include but are not limited to alkyl betaines, alkyl amidopropyl betaines, alkyl sulphobetaines, alkyl glycinates, alkyl carboxyglycinates, alkyl amphopropionates, alkyl amidopropyl hydroxysultaines, acyl taurates and acyl glutamates wherein the alkyl and acyl groups have from 8 to 18 carbon atoms. Examples include cocamidopropyl betaine, sodium cocoamphoacetate, cocamidopropyl hydroxysultaine, and sodium cocamphopropionate.

The cationic surfactants can be any of the cationic surfactants known or previously used in the art of aqueous surfactant compositions. Suitable cationic surfactants include but are not limited to alkyl amines, alkyl imidazolines, ethoxylated amines, quaternary compounds, and quaternized esters. In addition, alkyl amine oxides can behave as a cationic surfactant at a low pH. Examples include lauramine oxide, dicetyldimonium chloride, cetrimonium chloride.

Other surfactants which can be utilized in the present invention are set forth in more detail in WO 99/21530, U.S. Pat. No. 3,929,678, U.S. Pat. No. 4,565,647, U.S. Pat. No. 5,456,849, U.S. Pat. No. 5,720,964, U.S. Pat. No. 5,858,948, and U.S. Pat. No. 7,115,550, which are herein incorporated by reference. Other suitable surfactants are described in McCutcheon's Emulsifiers and Detergents (North American and International Editions, by Schwartz, Perry and Berch) which is hereby fully incorporated by reference.

In one aspect of the invention, the non-crosslinked, linear acrylic copolymer of the invention is utilized in any amount that is sufficient to increase the CMC of a surfactant containing composition in comparison to a comparable surfactant composition which is free of the non-crosslinked, linear acrylic copolymer. In another aspect of the invention, the non-crosslinked, linear acrylic copolymer is utilized in any amount effective to mitigate ocular and/or dermal irritation typically associated with surfactant compositions. The CMC value of a surfactant containing composition can readily be determined as disclosed in International Patent Application No. WO 2005/023970 and U.S. Pat. Nos. 7,084,104 and 7,098,180 which are incorporated herein by reference, as well as exemplified in the examples which follow.

Irritation elicited by a surfactant containing composition can be measured by the Trans-Epithelial Permeability (TEP) Test as set forth in Invittox Protocol No. 86 (May 1994). As disclosed in WO 2005/023970, supra, Trans-Epithelial Permeability (TEP) values have a direct correlation to the ocular and/or dermal irritation associated with a particular surfactant composition. Higher TEP values are indicative of milder compositions as compared to compositions having lower TEP values.

In still another aspect of the invention, the amount of non-crosslinked, linear acrylic copolymer utilized in surfactant containing compositions, such as, for example, personal care cleansing, animal and pet care cleansing, household care cleaning, and industrial and institutional cleaning compositions can range from above 0 wt. % to about 20 wt. % based on the total weight of the surfactant containing composition. In a further aspect, the amount of copolymer mitigant ranges from about 0.01 wt. % to about 10 wt. %, from about 0.01 wt. % to about 9 wt. % in a still further aspect, and from about 0.1 wt. % to about 8 wt. % in another aspect (all percentages based on the weight of the total surfactant containing composition).

In one aspect, the surfactant(s) utilized in the surfactant containing composition can be employed in amounts typically utilized in personal care cleansing and animal and pet care cleansing, household care cleaning, and industrial and institutional cleaning compositions. In another aspect, the amount of surfactant(s) can range from about 0.1 wt. % to about 50 wt. %, based on the total weight of the surfactant containing composition. In a further aspect, the amount of surfactant(s) ranges from about 0.5 wt. % to about 45 wt. %, from about 1 wt. % to about 15 wt. % in a still further aspect, and from about 3 wt. % to about 8 wt. % (all percentages based on the weight of the total surfactant containing composition). One advantage of utilizing the irritation mitigating polymers of the invention is that the polymers permit higher amounts of surfactant to be employed in cleansing and cleaning compositions which in turn enhances the detersive properties of such compositions without adversely affecting the rheology profile. Accordingly, higher amounts of surfactant than typically utilized above can be employed.

Water is utilized as a diluent in the mitigated surfactant compositions of the invention. In one aspect, the amount of water can range from about 5 wt. % to about 95 wt. % of the weight of the total surfactant containing composition. In another aspect the amount of water can range from about 10 wt. % to about 90 wt. %, from about 20 wt. % to about 80 wt. % in a further aspect, and from about 30 wt. % to about 75 wt.

% in a still further aspect, based on the total weight of the surfactant containing composition.

The surfactant compositions of the invention can contain one or more of a wide variety of components well known to those skilled in the art, such as chelators, humectant skin or hair conditioners, lubricants, moisture barriers/emollients, opacifiers, preservatives, spreading aids, conditioning polymers, vitamins, viscosity adjusters, viscosity modifiers/emulsifiers, suspended beads, enzymes, builders/electrolytes, buffers, hydrotropes (e.g., ethanol, sodium xylene sulfonate, and sodium cumene sulfonate), inorganics (e.g., clay, bentonite, kaolin), soil releasing agents, color additives, as well as the numerous other optional components for enhancing and maintaining the properties of the personal care compositions. Such components are also described in detail in well known sources such as Mitchell C. Schlossman, The Chemistry and Manufacture of Cosmetics, Volumes I and II, Allured Publishing Corporation, 2000.

Suitable chelators include EDTA (ethylene diamine tetraacetic acid) and salts thereof such as disodium EDTA, citric acid and salts thereof, cyclodextrins, and the like, and mixtures thereof. Such suitable chelators typically comprise from about 0.001 wt. % to about 3 wt. % in one aspect, from about 0.01 wt. % to about 2 wt. % in another aspect, and from about 0.01 wt. % to about 1 wt. % in a further aspect of the invention based on the total weight of the surfactant containing composition.

Suitable humectant skin and/or hair conditioners include allantoin; pyrrolidonecarboxylic acid and its salts; hyaluronic acid and its salts; sorbic acid and its salts; urea; lysine, arginine, cystine, guanidine, and other amino acids; polyhydroxy alcohols such as glycerin, propylene glycol, hexylene glycol, hexanetriol, ethoxydiglycol, dimethicone copolyol, and sorbitol, and the esters thereof; polyethylene glycol; glycolic acid and glycolate salts (e.g. ammonium and quaternary alkyl ammonium); lactic acid and lactate salts (e.g. ammonium and quaternary alkyl ammonium); sugars and starches; sugar and starch derivatives (e.g. alkoxylated glucose); D-panthenol; lactamide monoethanolamine; acetamide monoethanolamine; and the like, and mixtures thereof. Preferred humectants include the $C_3$ to $C_6$ diols and triols, such as glycerin, propylene glycol, hexylene glycol, hexanetriol, and the like, and mixtures thereof. Such suitable humectants typically comprise from about 1 wt. % to about 10 wt. % in one aspect, from about 2 wt. % to about 8 wt. % in another aspect, and from about 3 wt. % to about 5 wt. % in a further aspect of the invention, based on the total weight of the surfactant containing composition.

Suitable lubricants include volatile silicones, such as cyclic or linear polydimethylsiloxanes, and the like. The number of silicon atoms in cyclic silicones preferably is from about 3 to about 7 and more preferably 4 or 5. Exemplary volatile silicones, both cyclic and linear, are available from Dow Corning Corporation as Dow Corning 344, 345 and 200 fluids. The linear volatile silicones typically have viscosities of less than about 5 cP at 25° C., while the cyclic volatile silicones typically have viscosities of less than about 10 cP at 25° C. "Volatile" means that the silicone has a measurable vapor pressure. A description of volatile silicones can be found in Todd and Byers, "Volatile Silicone Fluids for Cosmetic Formulations", Cosmetics and Toiletries, Vol. 91, January 1976, pp. 29-32, incorporated herein by reference. Other suitable lubricants include polydimethylsiloxane gums, aminosilicones, phenylsilicones, polydimethyl siloxane, polydiethylsiloxane, polymethylphenylsiloxane, polydimethylsiloxane gums, polyphenyl methyl siloxane gums, amodimethicone, trimethylsiloxyamodimethicone, diphenyl-dimethyl polysiloxane gums, and the like. Mixtures of lubricants can also be used. Such suitable lubricants typically comprise from about 0.10 wt. % to about 15 wt. % in one aspect, from about 0.1 wt. % to about 10 wt. % in another aspect, and from about 0.5 wt. % to about 5 wt. % in a further aspect of the invention, based on the total weight of the surfactant containing composition.

Suitable moisture barriers and or emollients include mineral oil; stearic acid; fatty alcohols such as cetyl alcohol, cetearyl alcohol, myristyl alcohol, behenyl alcohol, and lauryl alcohol; cetyl acetate in acetylated lanolin alcohol, isostearyl benzoate, dicaprylyl maleate, caprylic and capric triglyceride; petrolatum, lanolin, coco butter, shea butter, beeswax and esters there of; ethoxylated fatty alcohol esters such as ceteareth-20, oleth-5, and ceteth-5; avocado oil or glycerides; sesame oil or glycerides; safflower oil or glycerides; sunflower oil or glycerides; botanical seed oils; volatile silicone oils; non-volatile emollients, and the like, and mixtures thereof. Suitable non-volatile emollients include fatty acid and fatty alcohol esters, highly branched hydrocarbons, and the like, and mixtures thereof. Such fatty acid and fatty alcohol esters include decyl oleate, butyl stearate, myristyl myristate, octyldodecyl stearoylstearate, octylhydroxystearate, di-isopropyl adipate, isopropyl myristate, isopropyl palmitate, ethyl hexyl palmitate, isodecyl neopentanoate $C_{12}$ to $C_{15}$ alcohol benzoate, diethyl hexyl maleate, PPG-14 butyl ether and PPG-2 myristyl ether propionate, cetearyl octanoate, and the like, and mixtures thereof. Suitable highly branched hydrocarbons include isohexadecane and the like, and mixtures thereof. Such suitable moisture barriers and/or emollients, alone or in combination, typically comprise from about 1 wt. % to about 20 wt. % in one aspect, from about 2 wt. % to about 15 wt. % in another aspect, and from about 3 wt. % to about 10 wt. % in a further aspect of the invention, based on the total weight of the surfactant containing composition.

Suitable opacifiers include glycol fatty acid esters; alkoxylated fatty acid esters; polymeric opacifiers, fatty acid alcohols; hydrogenated fatty acids, waxes and oils; kaolin; magnesium silicate; titanium dioxide; silica; and the like, and mixtures thereof. Such suitable opacifiers typically comprise from about 0.1 wt. % to about 8 wt. % in one aspect, from about 0.5 wt. % to about 6 wt. % in another aspect, and from about 1 wt. % to about 5 wt. % in a further aspect of the invention, based on the total weight of the surfactant containing composition.

Suitable preservatives include polymethoxy bicyclic oxazolidine, methylparaben, propylparaben, ethylparaben, butylparaben, benzoic acid and the salts of benzoic acid, benzyltriazole, DMDM hydantoin (also known as 1,3-dimethyl-5,5-dimethyl hydantoin), imidazolidinyl urea, phenoxyethanol, phenoxyethylparaben, methylisothiazolinone, methylchloroisothiazolinone, benzoisothiazolinone, triclosan, sorbic acid, quaternium-15, salicylic acid salts, and the like, and mixtures thereof. Such suitable preservatives typically comprise about 0.01 wt. % to about 1.5 wt. % in one aspect, from about 0.1 wt. % to about 1 wt. % in another aspect, and from about 0.3 wt. % to about 1 wt. % in a further aspect, based on the total weight of the surfactant containing composition.

Suitable spreading aids include hydroxypropyl methylcellulose, hydrophobically modified cellulosics, xanthan gum, cassia gum, guar gum, locust bean gum, dimethicone copolyols of various degrees of alkoxylation, boron nitride, talc, and the like, and mixtures thereof. Such suitable spreading aids typically comprise about 0.01 wt. % to about 5 wt. % in one aspect, from about 0.1 wt. % to about 3 wt. % in another aspect, and from about 0.1 wt. % to about 2.0 wt. % in a further aspect of the invention, based on the total weight of the surfactant containing composition.

Suitable conditioning polymers include quaternized polygalactomannans such as cationic guar, cationic cassia, cationic locust bean, quaternized cellulosics, polyquarternium 4, polyquarternium 7, polyquarternium 10, polyquarternium 11, polyquarternium 39, polyquarternium 44, and the like, and mixtures thereof. Such suitable conditioning agents typically comprise about 0.01 wt. % to about 3 wt. % in one aspect, from about 0.1 wt. % to about 2 wt. % in another aspect, and from about 0.1 wt. % to about 1 wt. % in a further aspect of the invention, based on total weight of the surfactant containing composition.

Suitable vitamins include vitamin A, vitamin B, biotin, pantothenic acid, vitamin C, vitamin D, vitamin E, tocopherol acetate, retinyl palmitate, magnesium ascorbyl phosphate, and the like, and derivatives and mixtures thereof.

Suitable viscosity adjusters include isopropyl alcohol, ethanol, sorbitol, propylene glycol, diethylene glycol, triethylene glycol, dimethyl ether, butylene glycol, and the like, and mixtures thereof. Such suitable viscosity adjusters typically comprise from about 0.1 wt. % to about 60 wt. % in one aspect, from about 1 wt. % to about 40 wt. % in another aspect, and from about 5 wt. % to about 20 wt. % in a further aspect of the invention based on the total weight of the surfactant containing compositions.

Suitable viscosity modifiers/emulsifiers include natural, semi-synthetic, and synthetic polymers. Examples of natural and modified natural polymers include xanthan gums, cellulosics, modified cellulosics, starches, polysaccharides, and the like. Examples of synthetic polymers include crosslinked polyacrylates, alkali swellable emulsion acrylate copolymers, hydrophobically modified alkali swellable copolymers, hydrophobically modified non-ionic polyurethanes, and the like. Mixtures can also be used. Such suitable viscosity modifiers/emulsifiers, alone or in combination, typically comprise from about 0.1 wt. % to about 5 wt. % in one aspect, from about 0.3 wt. % to about 3 wt. % in another aspect, and from about 0.5 wt. % to about 2 wt. % in still another aspect of the invention, based on the total weight of the surfactant containing compositions.

When used in conjunction with a suspending agent, the surfactant containing composition can contain from about 0.1 wt. % to about 10 wt. % based on the total weight of the composition of a cosmetic bead component suspended in the composition. Cosmetic beads can be included for aesthetic appearance or can function as micro- and macroencapsulants in the delivery of beneficial agents to the skin. Exemplary bead components include but are not limited to microsponges, gelatin beads; alginate beads; expanded polystyrene beads; jojoba beads; polyethylene beads; Unispheres® cosmetic beads (Induchem), such as for example, product designations YE-501 and UEA-509; Lipopearls™ vitamin E encapsulated in gelatin beads (Lipo Technologies Inc.); and Confetti™ (United Guardian Company). A suitable suspending agent includes a crosslinked acrylic copolymer rheology modifier such as Carbopol® Aqua SF-1 available from Noveon Consumer Specialties of Lubrizol Advanced Materials, Inc. Such rheology modifiers can be employed in a range of from about 1.5 wt. % to about 5 wt. % (polymer solids), based on the weight of the surfactant containing composition.

Other optional components can be used in order to maintain and enhance the properties of personal care compositions. Such optional components include various solvents, propellants, combing aids, pearlizing agents, botanical extracts, antioxidants, antistatic agents, anticorrosion agents, agents suitable for product aesthetics, such as fragrances, perfumes, pigments, dyes, and colorings, and the like.

While overlapping weight ranges for the various components and ingredients that can be contained in the surfactant containing compositions of the invention have been expressed for selected embodiments and aspects of the invention, it should be readily apparent that the specific amount of each component in the surfactant containing composition will be selected from its disclosed range such that the amount of each component is adjusted such that the sum of all components in the composition will total 100 wt. %. The amounts employed will vary with the purpose and character of the desired product and can be readily determined by one skilled in the formulation arts and from the literature.

It is also to be recognized that the choice and amount of ingredients in surfactant containing compositions including the polymer mitigants of the invention will vary depending on the intended product and its function, as is well known to those skilled in the formulation arts. An extensive listing of substances and their conventional functions and product categories appears in the INCI Dictionary, generally, and in Vol. 2, Sections 4 and 5 of the Seventh Edition, in particular, incorporated herein by reference.

The following examples further describe and demonstrate embodiments within the scope of the present invention. These examples are presented solely for the purpose of illustration, and are not to be construed as limitations of the present invention since many variations thereof are possible without departing from the spirit and scope thereof. Unless otherwise specified weight percents (wt. %) are given in weight percent based on the weight of the total composition.

Methods Description

Turbidity

When reported, the turbidity of a surfactant containing composition was determined in Nephelometric Turbidity Units (NTU) employing a nephelometric turbidity meter (Mircro 100 Turbidimeter, HF Scientific, Inc.) with distilled water (NTU=0) as the standard. Six dram screw cap vials (70 mm×25 mm) are filled almost to the top with test sample and centrifuged at 100 rpm until all bubbles are removed. Upon centrifugation each sample vial is wiped with tissue paper to remove any smudges before placement in the turbidity meter. The sample is placed in the turbidity meter and a reading is taken. Once the reading stabilizes the NTU value is recorded. The vial is given one-quarter turn and another reading is taken and recorded. This is repeated until four readings are taken. The lowest of the four readings is reported as the turbidity value. Compositions having an NTU value of about 90 or greater were judged turbid.

Viscosity

Brookfield rotating spindle method: The viscosity of each polymer containing composition is measured as mPa·s, employing a Brookfield rotating spindle viscometer, Model RVT (Brookfield Engineering Laboratories, Inc.), at about 20 revolutions per minute (rpm), at ambient room temperature of about 20 to 25° C. (hereafter referred to as viscosity). Appropriate spindle sizes are set forth in the examples.

Brookfield Helipath™ method: Accurate viscosity measurements of highly viscous materials are difficult to obtain with rotational viscometers because the rotating spindle creates a void space or channel in the substance being evaluated making it impossible to obtain viscosity readings. The Brookfield Helipath™ Stand (Brookfield Engineering Laboratories, Inc.) mounted with a Brookfield RVT viscometer equipped with a T-bar spindle slowly lowers or raises the RVT viscometer so that the rotating T-bar spindle (@ 5 rpm) cuts a helical path through the test sample. The spindle is always in contact with the test sample eliminating void space creation or channeling. Viscosity is measured after allowing the composition to age for at least about 24 hours at ambient room temperature.

Yield Value

Yield Value, also referred to as Yield Stress, is defined as the initial resistance to flow under stress. It is measured by the Brookfield Yield Value (BYV) Extrapolation Method using a Brookfield viscometer (Model RVT). The Brookfield viscometer is used to measure the torque necessary to rotate a spindle through a liquid sample at speeds of 0.5 to 100 rpm. Multiplying the torque reading by the appropriate constant for the spindle and speed gives the apparent viscosity. Yield Value is an extrapolation of measured values to a shear rate of zero. The BYV is calculated by the following equation:

$$BYV, \text{dyn/cm}^2 = (\eta_{\alpha 1} - \eta_{\alpha 2})/100$$

where $\eta_{\alpha 1}$ and $\eta_{\alpha 2}$=apparent viscosities obtained at two different spindle speeds (0.5 rpm and 1.0 rpm, respectively). These techniques and the usefulness of the Yield Value measurement are explained in Technical Data Sheet Number 244 (Revision: 5/98) from Noveon Consumer Specialties of Lubrizol Advanced Materials, Inc., herein incorporated by reference. Low yield values (<50 dyns/cm$^2$) are indicative of smooth and Newtonian-like flow properties Critical Micelle Concentration Protocol The CMC of an aqueous solution of test sample is determined by measuring the surface tension of the sample at ambient room temperature over a range of progressively increasing surfactant concentrations (Forward Titration Tensiometry Test). The test sample is sequentially dosed with a surfactant dosing solution using the Krüss K12 automatic tensiometer (Krüss USA, Matthews, N.C.) integrated with a 665 Dosimat automated dosing meter and personal computer loaded with LabDesk™ (version 3.0 with CMC add-on program) measurement and analysis software. The test is conducted via the Wilhelmy plate method (Holmberg, K.; Jonsson, B.; Kronberg, B.; Lindman, B. Surfactants and Polymers in Aqueous Solution, Wiley & Sons, p. 347) using a platinum plate (19.9 mm wide×10 mm high×0.2 mm thick) and SV20 glass sample vessel (66.5 mm diameter×35.0 mm high; volume=121.563 ml).

A 100 g test sample solution is prepared by weighing an amount equal to 500 mg (polymer solids) of the non-crosslinked, linear acrylic copolymer mitigant of the invention into a suitable container. HPLC grade water (EMD Chemicals Inc, NJ) is added to the copolymer mitigant in an amount sufficient to bring the weight of the solution to 100 g. The test sample can be tested in the unneutralized state or can be neutralized to a desired pH value or degree of neutralization depending on the test parameters.

The surfactant dosing solution is prepared by dispersing a sufficient amount of the surfactant in HPLC grade water to obtain a stock concentration of 5750 mg/L of surfactant actives in HPLC grade water. The supply line of the dosimeter is placed into the dosing solution.

Fifty ml of the test sample is measured into the sample vessel equipped with a magnetic stir bar and is placed onto the tensiometer platform for surfactant dosing and surface tension analysis. Forty-two sequential surfactant doses of increasing concentration are metered into the test sample, increasing the surfactant concentration from 0 mg/L in the initial dose to approximately 3255 mg/L after the final dose. Subsequent to each metered dose, the surface tension of the test solution is measured by the tensiometer. Following each dosing cycle the solution is stirred for at least 3 minutes before the surface tension measurement is taken. From the data generated, a plot of measured surface tension versus concentration is created, giving a surface tension profile of the test sample at specific surfactant concentrations. The curve that is produced exhibits a sharp break at a particular point below which surface tension is not significantly affected by surfactant concentration. The surfactant concentration at this break point corresponds to the CMC. The approximate CMC point is located at the intersection of straight lines drawn through the data points obtained for concentration dependent portion of the plot and through the data points obtained for the concentration independent section of the plot.

Molecular Weight Determination

The number average ($M_n$) of the polymer samples are determined via the GPC method using a PL-220 high temperature GPC instrument manufactured by Polymer Laboratories. The instrument is integrated with a Compaq Dell OptiPlex GX270 computer with Waters Empower Pro LC/GPC software. Approximately 0.02 g polymer sample is dissolved in 5 ml of dimethyl actamide (DMAc), containing 250 ppm BHT and 0.05 molar NaNO$_3$. The test sample solution is gently shaken for about two hours and filtered with a 0.45 µm PTFE disposable disc filter. The chromatographic conditions are:

| Mobile phase: | DMAc, with 250 ppm BHT and 0.05m NaNO$_3$, 70° C., 1.0 ml/min. |
|---|---|
| Sample size: | 100 µl |
| Column set: | PLgel (Guard + 2 × Mixed-B), all 10 µm, in series |
| Detector: | Refractive Index Detector |
| Calibration standard: | PMMA |

Emulsion Polymerization Method

A general emulsion polymerization procedure for the preparation of the non-crosslinked, linear acrylic copolymers of the present invention is provided as follows. A monomer emulsion is prepared in a first reactor equipped with a nitrogen inlet and a mixing agitator by combining the desired amount of each monomer with water that contains an emulsifying amount of an anionic surfactant. The components are mixed under a nitrogen atmosphere to until an emulsion is obtained. To a second reactor equipped with a mixing agitator, nitrogen inlet and feed pumps are added a desired amount of water and optional additional anionic surfactant. The contents are heated under a nitrogen atmosphere with mixing agitation. After the second reactor reaches a temperature in the range of about 70 to 95° C., a desired amount of a free radical initiator is injected into the solution in the second reactor. The monomer emulsion from the first reactor is then metered into the second reactor over a period ranging from about 1 to about 4 hours at a controlled reaction temperature in the range of about 80 to 90° C. After completion of the monomer addition, an additional quantity of free radical initiator can be added to the second reactor, if desired. The resulting reaction mixture is held at a temperature of about 85 to 95° C. for a time period sufficient to complete the polymerization reaction, typically about 90 minutes. The resulting polymer emulsion can then be cooled and discharged from the reactor.

Examples 1 to 9

A monomer reaction mixture is prepared in a first reactor under a nitrogen atmosphere and outfitted with an agitator rotating at about 500 rpm. The monomers in the amounts set forth in Table 1 (wt. % based on total monomer weight) are weighed into the reactor containing about 17.5% by wt. of deionized water containing about 1.0% by wt. of 30% aqueous sodium lauryl sulfate. To a second reactor, equipped with a mixing agitator, nitrogen inlet and feed pumps are added about 47.0% by wt. of deionized water and about 0.1% by wt. of 30% aqueous sodium lauryl sulfate. The contents of the second reactor are heated with mixing agitation at a rotation speed of about 350 rpm under a nitrogen atmosphere. After the contents of the second reactor reached a temperature in the range of about 85 to 88° C., about 0.6% by wt of 2.5% ammonium persulfate solution (a free radical initiator) is injected into the so-formed hot surfactant solution in the second reactor. The aqueous emulsion of the monomer mixture from the first reactor is gradually metered into the second reactor over a period of about 100 to 120 minutes at a controlled reaction temperature in the range of about 85 to 88° C. Simultaneously, about 4.5% by wt. of 0.25% ammonium persulfate solution is metered into the reaction mixture in the second reactor for about 120 to 150 minutes and the temperature of the reaction is maintained at about 90° C. Additional amount of initiator may be added to complete residual-free polymerization. The resulting polymer emulsion is cooled to room temperature, discharged from the reactor and collected.

TABLE 1

| Example No. | EA (wt. %) | MAA (wt. %) | TEGDMA (wt. %) | TMPTA (wt. %) | Acrylate Copolymer | $M_n$ |
|---|---|---|---|---|---|---|
| 1 (comparative) | 22.08 | 7.80 | 0.06 | 0.06 | crosslinked | Note 1 |
| 2 | 15.00 | 15.00 | 0 | 0 | Linear | 9,221 |
| 3 | 19.95 | 10.05 | 0 | 0 | Linear | 23,948 |
| 4 | 20.40 | 9.60 | 0 | 0 | Linear | 27,685 |
| 5 | 21.30 | 8.70 | 0 | 0 | Linear | 31,620 |
| 6 | 21.90 | 8.10 | 0 | 0 | Linear | 26,405 |
| 7 | 22.00 | 7.80 | 0 | 0 | Linear | 19,711 |
| 8 | 24.00 | 6.00 | 0 | 0 | Linear | 16,609 |

EA = ethyl acrylate
MAA = methacrylic acid
TEGDMA = triethyleneglycol dimethacrylate (crosslinker)
TMPTA = trimethylolpropane triacrylate (crosslinker)
Note 1: The molecular wt. was not measured because of crosslinking, but is estimated to be substantially above 500,000 $M_n$ Examples 9 to 15

The viscosity, yield value and turbidity values for the non-crosslinked, linear polymers of Examples 2 through 9 are measured and reported in Table 2. Mucilages of the non-crosslinked, linear polymers are prepared by neutralizing 1, 2, 3, and 5 wt. % (polymer solids) of each polymer in deionized water with an 18% aqueous solution of NaOH to a pH of about 7.

TABLE 2

| | Example No. | | | | | | |
|---|---|---|---|---|---|---|---|
| | 9 | 10 | 11 | 12 | 13 | 14 | 15 |
| Polymer of Example | 2 | 3 | 4 | 5 | 6 | 8 | 9 |
| Spindle No. @ 20 RPM | 1 | 1 | 1 | 1 | 1 | 1 | 1 |
| Viscosity (mPa·s) (1% mucilage) | 23 | 36 | 24 | 25 | 20 | 16 | 14 |
| Yield Value (dyn/cm$^2$) | 0 | 0 | 0 | 0 | 0 | 0 | 0 |
| NTU | 6.1 | 4.7 | 5.7 | 3.6 | 1.1 | 2.9 | 1.5 |
| Spindle No. @ 20 RPM | 1 | 1 | 1 | 1 | 1 | 1 | 1 |

TABLE 2-continued

| | Example No. | | | | | | |
|---|---|---|---|---|---|---|---|
| | 9 | 10 | 11 | 12 | 13 | 14 | 15 |
| Viscosity (mPa·s) (2% mucilage) | 28 | 58 | 32 | 32 | 25 | 18 | 16 |
| Yield Value (dyn/cm$^2$) | 0 | 0 | 0 | 0 | 0 | 0 | 0 |
| NTU | 13.3 | 8.1 | 8.6 | 3.7 | 1.9 | 3.8 | 3.1 |
| Spindle No. @ 20 RPM | 1 | 1 | 1 | 1 | 1 | 1 | 1 |
| Viscosity (mPa·s) (3% mucilage) | 34 | 90 | 39 | 43 | 40 | 22 | 18 |
| Yield Value (dyn/cm$^2$) | 0 | 0 | 0 | 0 | 0 | 0 | 0 |
| NTU | 24.9 | 7.3 | 8.5 | 2.3 | 0.8 | 3.5 | 3.6 |
| Spindle No. @ 20 RPM | — | — | 1 | 1 | 1 | 1 | — |
| Viscosity (mPa·s) (5% mucilage) | — | — | 61 | 87 | 122 | 34 | — |
| Yield Value (dyn/cm$^2$) | — | — | <10 | <10 | <10 | <10 | — |
| NTU | — | — | 11.5 | 2.9 | 1.1 | 2.1 | — |

The zero and minor yield value increases exhibited by the non-crosslinked, linear polymers of the invention across ranges of increasing viscosity is indicative of Newtonian rheological properties. The data indicate that the rheological properties (e.g. viscosity and yield values) do not significantly increase as the mucilage concentration of the polymer is increased.

Examples 16 to 18

Comparative

The viscosity, yield value and turbidity values are measured for the crosslinked polymer of comparative Example 1 and two commercially available crosslinked acrylic containing copolymers marketed as Carbopol® Aqua SF-1 and Carbopol® ETD 2020. Mucilages of the crosslinked polymers are prepared as in Examples 9 to 15. The highly viscous nature of mucilages prepared from Carbopol ETD 2020 prevented intimate contact of the mucilage with the pH measurement probe. Accordingly, the ETD 2020 mucilages are not neutralized to a target pH point but rather to a target pH range of about 6.5 to about 7.5. The measured rheological properties of each polymer are set forth in Table 3.

TABLE 3

| | Example No. | | |
|---|---|---|---|
| | 16 (comparative) | 17 (comparative) | 18 (comparative) |
| Crosslinked Polymer | Polymer of Ex. 1 | Aqua SF-1[1] | ETD 2020[2] |
| Spindle No. @ 20 RPM | 3 | 4 | 7 |
| Viscosity (mPa·s) (1% mucilage) | 2,050 | 3,300 | 65,000 |
| Yield Value (dyn/cm$^2$) | 146 | 238 | 5,360 |
| NTU | 8.3 | 15.7 | |
| Spindle No. @ 20 RPM | 4 | 4 | 7 |
| Viscosity (mPa·s) (2% mucilage) | 4,120 | 6,250 | 155,000 |
| Yield Value (dyn/cm$^2$) | 226 | 455 | 7,000 |
| NTU | 3.7 | 7.5 | |
| Spindle No. @ 20 RPM | 4 | 4 | — |
| Viscosity (mPa·s) (3% mucilage) | 6,600 | 9,100 | Note 1 |
| Yield Value (dyn/cm$^2$) | 484 | 664 | Note 1 |
| NTU | 3.3 | 6.5 | |
| Spindle #; 20 RPM | 5 | 5 | |
| Viscosity (mPa·s) (5% mucilage) | 17,500 | 17,500 | Note 1 |

TABLE 3-continued

| | Example No. | | |
|---|---|---|---|
| | 16 (comparative) | 17 (comparative) | 18 (comparative) |
| Yield Value (dyn/cm$^2$) | 1,210 | 1,750 | Note 1 |
| NTU | 4.5 | 9.7 | Note 2 |

[1]Carbopol ® Aqua SF-1 = crosslinked copolymer of (meth)acrylic acid and $C_1$ to $C_5$ alkyl acrylate (available from Noveon Consumer Specialties of Lubrizol Advanced Materials, Inc.)
[2]Carbopol ® ETD 2020 = crosslinked copolymer of (meth)acrylic acid and $C_{10}$ to $C_{30}$ alkyl acrylate (available from Noveon Consumer Specialties of Lubrizol Advanced Materials, Inc.)
Note 1:
The viscosity and yield value of the mucilage is too high to measure on the Brookfield RVT viscometer employing standard spindles because of the channeling phenomenon.
Note 2:
Too viscous to measure NTU

Example 19

Comparative

The viscosity of 1, 2, 3, 4, and 5 wt. % (polymer solids) mucilages of Carbopol® ETD 2020 rheology modifier is determined using a Brookfield RVT viscometer equipped with Brookfield Helipath™ Stand and T-bar spindle (T-7). The mucilage samples are prepared as in Example 18. Viscosity results are set forth in Table 4.

TABLE 4

| | Mucilage (wt. %) | | | | |
|---|---|---|---|---|---|
| | 1 | 2 | 3 | 4 | 5 |
| Viscosity[1] (dyn/cm$^2$) | 264,000 | 530,000 | 956,000 | 1,300,000 | 1,800,000 |
| Torque (%) | 14.2 | 26.8 | 46.8 | 65.8 | 90.5 |

[1]Brookfield Helipath method

The data in Tables 3 and 4 indicate that the rheological properties (e.g., viscosity build and yield values) of crosslinked polymers increase as the mucilage concentration of the polymer is increased. Viscosity curves for the polymer mucilages at 1, 2, 3, and 5 wt. % (polymer solids) prepared as set forth in comparative Examples 16 (crosslinked) and 17 (crosslinked) and the non-crosslinked, linear polymer mucilage prepared as in Example 14 (non-crosslinked) are shown in FIG. 1.

Example 20

The CMC of two separate anionic surfactant compositions, one containing sodium laureth-2 sulfate (SLES-2) and a non-crosslinked, linear polymer, and the other containing SLES-2 and a crosslinked commercially available polymer, are determined by plotting tensiometry data generated by the Krüss K12 automatic tensiometer. The CMC methodology as described in the CMC protocol is utilized, except that the surfactant stock solution is 5762 mg/L and the titrations are run from 0 mg/L to 3200 mg/L of SLES-2. The titrations are conducted on multiple samples of each polymer (500 mg/L), wherein each sample is neutralized to the degree of neutralization (DN) set forth in the table immediately below with an 18% NaOH solution. The amount of NaOH added for a desired degree of neutralization is based on the acid number of the respective polymer. The non-crosslinked, linear polymer of Example 7 and the crosslinked commercially available polymer available under the Carbopol® Aqua SF-1 trade name are utilized in the titration. The CMC values for each polymer at respective DN's are set forth in Table 5.

TABLE 5

| DN | Linear Polymer[1]/SLES-2 (CMC) | Crosslinked Polymer[2]/SLES-2 (CMC) | pH |
|---|---|---|---|
| SLES-2[3] control (no polymer) (no neutralization) | 45 | 45 | NA |
| 0% | 114 | 108 | 5 |
| 20% | 170 | 174 | 6.8 |
| 40% | 152 | 167 | 6.67 |
| 60% | 60 | 116 | 6.69 |
| 80% | 37 | 82 | 7.2 |
| 100% | 35 | 72 | 10.8 |
| 200% | 27 | 40 | 12.4 |

Figure 2:
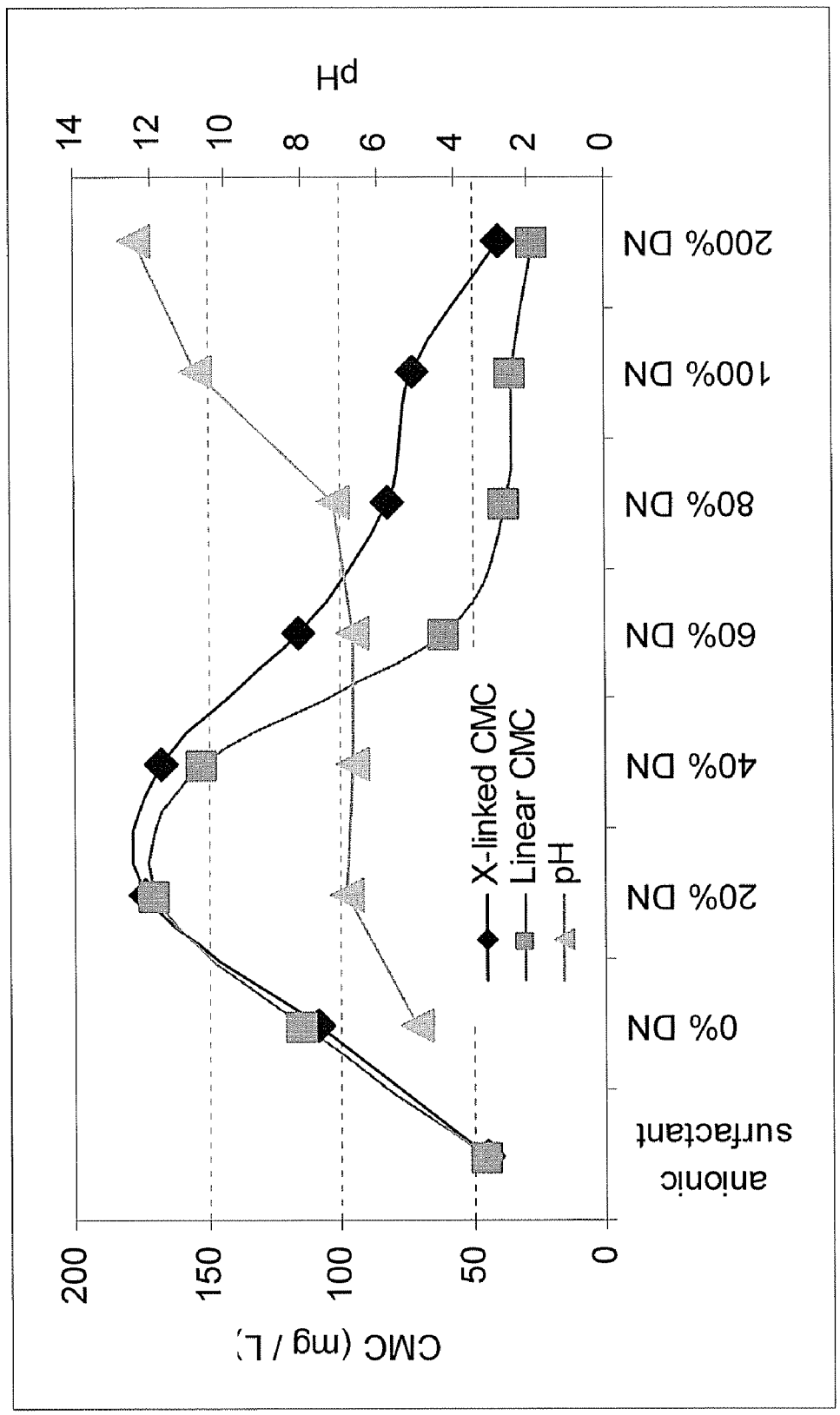
FIG. 2 is a graph comparing CMC values for anionic surfactant compositions containing a crosslinked acrylic based polymer and a polymer embodiment of the invention at varying degrees of polymer neutralization.

[1]non-crosslinked, linear polymer of Example 7
[2]Carbopol ® Aqua SF-1 = crosslinked copolymer of (meth)acrylic acid and $C_1$ to $C_5$ alkyl acrylate
[3]Sodium laureth-2 sulfate The non-crosslinked, linear polymer and the crosslinked polymer exhibit increasing CMC values when titrated with SLES-2. As shown in FIG. 2, a CMC optimum is reached for both polymers at relatively low DN values. This finding is unexpected because the literature does not disclose or suggest that the CMC of a surfactant composition can be increased by attenuating the degree of neutralization of a hydrophobically modified acrylic based polymer. Critical micelle concentration values for both polymers begin to decline at DN values of greater than about 25%. It is believed that the phenomenon is due to the repulsion of increased negative charge on the backbone of the respective polymers as the degree of neutralization is increased. Without wishing to be bound be theory, it is thought that micelle repulsion is more pronounced in linear acrylic based polymers (no crosslinks) than in crosslinked acrylic based copolymers due to the strong polymer chain to polymer chain network structure formed by the crosslinks. Despite the decline in CMC values at higher degrees of neutralization, the CMC is still higher than that of the surfactant alone.

Example 21

Figure 3:
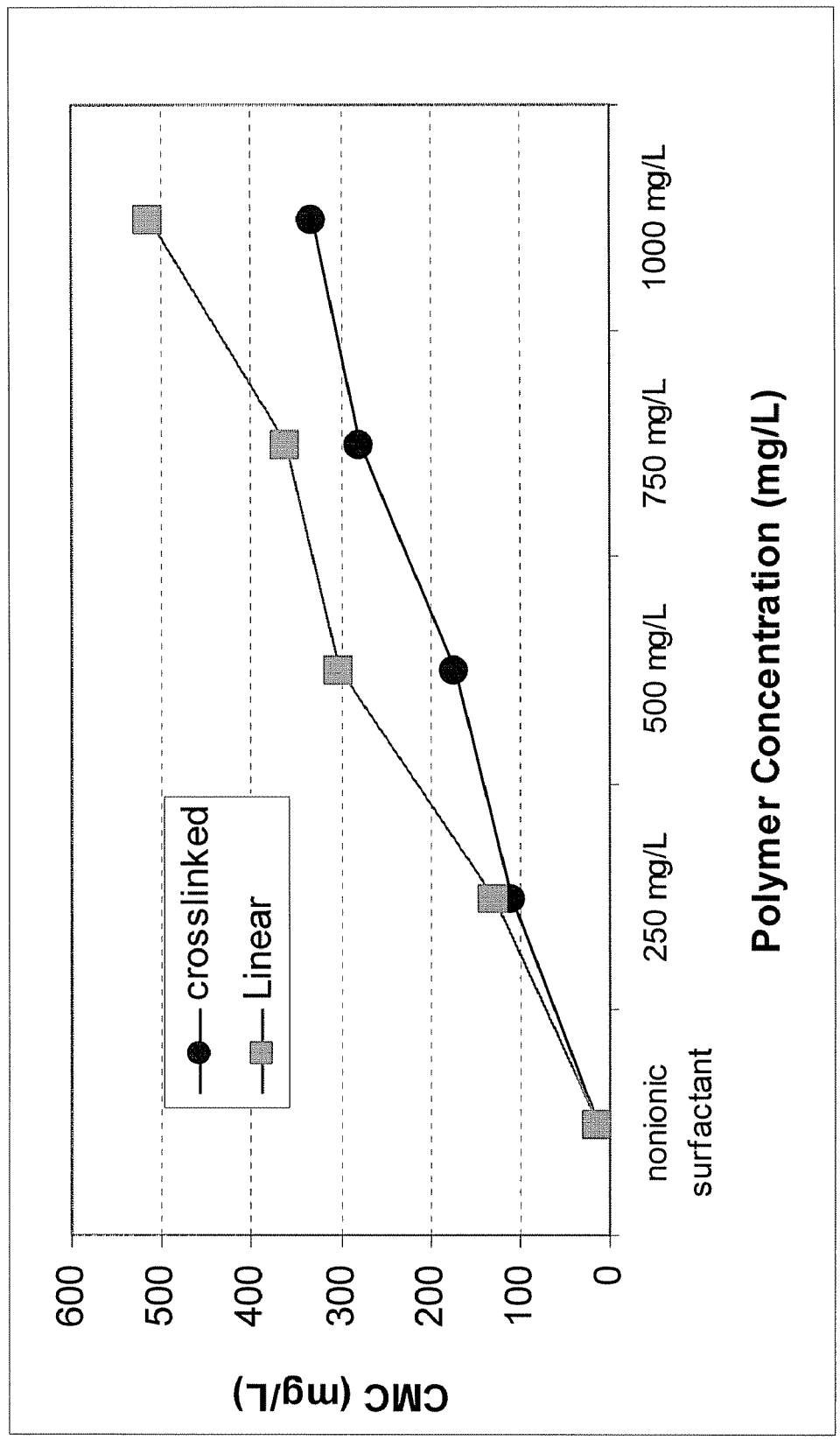
FIG. 3 is a graph depicting CMC values for nonionic surfactant compositions containing a crosslinked acrylic based polymer and a polymer embodiment of the invention at increasing levels of polymer concentration.

The CMC values of increasing concentrations of the non-crosslinked, linear polymer of Example 7 and the crosslinked commercially available polymer, Carbopol® Aqua SF-1 are obtained in nonionic surfactant by plotting tensiometry data generated by the Krüss K12 automatic tensiometer. The CMC methodology as described in the CMC protocol is utilized, except that the surfactant stock solution is 5752 mg/L and the titrations are run from 0 mg/L to 3257 mg/L of surfactant. The concentration of the polymer test solutions range from 0 mg/L to 1000 mg/L in 250 mg/L increments. The nonionic surfactant is an ethoxylated (about 7 ethylene oxide units) linear $C_{12}$ to $C_{15}$ alcohol available as Tomadol® 25-7. A comparative plot of the obtained CMC values for both polymers is shown in FIG. 3. Both polymers show an increase in CMC values as the polymer concentration increases. However, the non-crosslinked, linear polymer exhibits increased CMC values at identical polymer concentrations.

Examples 22 to 24

The rheological properties (e.g., viscosity, yield value), and turbidity of a non-crosslinked, linear polymer of the invention and two comparative crosslinked polymers are evaluated by separately formulating the polymers into a commercially available shampoo composition. A commercial shampoo, Johnson's® Baby Shampoo (Johnson & Johnson Consumer Companies Inc.) (lot No. 718844), purchased at retail is evaluated for pH, viscosity, yield value and turbidity. The rheological property values are recorded as the control experiment. Three 94 g aliquots of the commercial shampoo are weighed into separate glass containers. Into each of the containers is added with gentle stirring a 6 g of the respective polymer emulsions set forth in the table below to give approximately 1.8 grams of active polymer solids in each sample. An 18% NaOH solution is used to adjust the pH value of each test sample to approximately the pH value of the commercial control sample. The results are shown in Table 6.

TABLE 6

|  | Control | Example No. 22 | Example No. 23 | Example No. 24 |
|---|---|---|---|---|
| Polymer Type | No Polymer | Linear[1] | Crosslinked[2] | Crosslinked[3] |
| pH | 6.5 | 6.5 | 6.5 | 6.4 |
| Viscosity (mPa·s) | 2,480 | 1,450 | 19,000 | 22,200 |
| Yield Value (dyn/cm$^2$) | 4.0 | 3.0 | 280 | 350 |
| 0.5 rpm | 3,200 | 2,200 | 94,000 | 116,000 |
| 1 rpm | 2,800 | 1,900 | 66,000 | 81,000 |
| Turbidity (NTU) | 2.51 | 22.3 | 123 | 94.7 |

[1]Polymer of Example 7
[2]Polymer of comparative Example 1
[3]Carbopol® Aqua SF-1 polymer Examples 25 to 26

Following the procedure set forth in Examples 22 to 24, the rheological properties (e.g., viscosity and yield value) and turbidity of a non-crosslinked, linear polymer of the invention and a comparative crosslinked polymer are evaluated by separately formulating the polymers into a commercially available SLES-2 based shampoo, Johnson's® Head-to-Toe® Baby Wash (Johnson & Johnson Consumer Companies Inc.) (lot No. 720842) purchased at retail. The results are set forth in Table 7.

TABLE 7

|  | Control | Example No. 25 | Example No. 26 |
|---|---|---|---|
| Polymer Type | No Polymer | Linear[1] | Crosslinked[3] |
| pH | 6.7 | 6.63 | 6.9 |
| Viscosity (mPa·s) | 1,530 | 7,500 | 54,000 |
| Yield Value (dyn/cm$^2$) | −4 | 12 | 520 |
| 0.5 rpm | 1,200 | 12,000 | 200,000 |
| 1 rpm | 1,600 | 10,800 | 148,000 |
| Turbidity (NTU) | 2.53 | 16.3 | Hazy |

[1]Polymer of Example 7
[3]Carbopol® Aqua SF-1 polymer

The data in Table 6 and 7 demonstrates that the non-crosslinked, linear polymer exhibits very low viscosity properties and low yield values which is indicative of smooth flow characteristics. The rheological profile for the non-crosslinked, linear polymer is substantially similar to that of the commercial shampoo composition. On the other hand, the comparative crosslinked polymers exhibit high viscosity properties and high yield values which would adversely affect product packaging, handling, dispensing, sensory (consumer feel), and application.

Example 27

Figure 4:
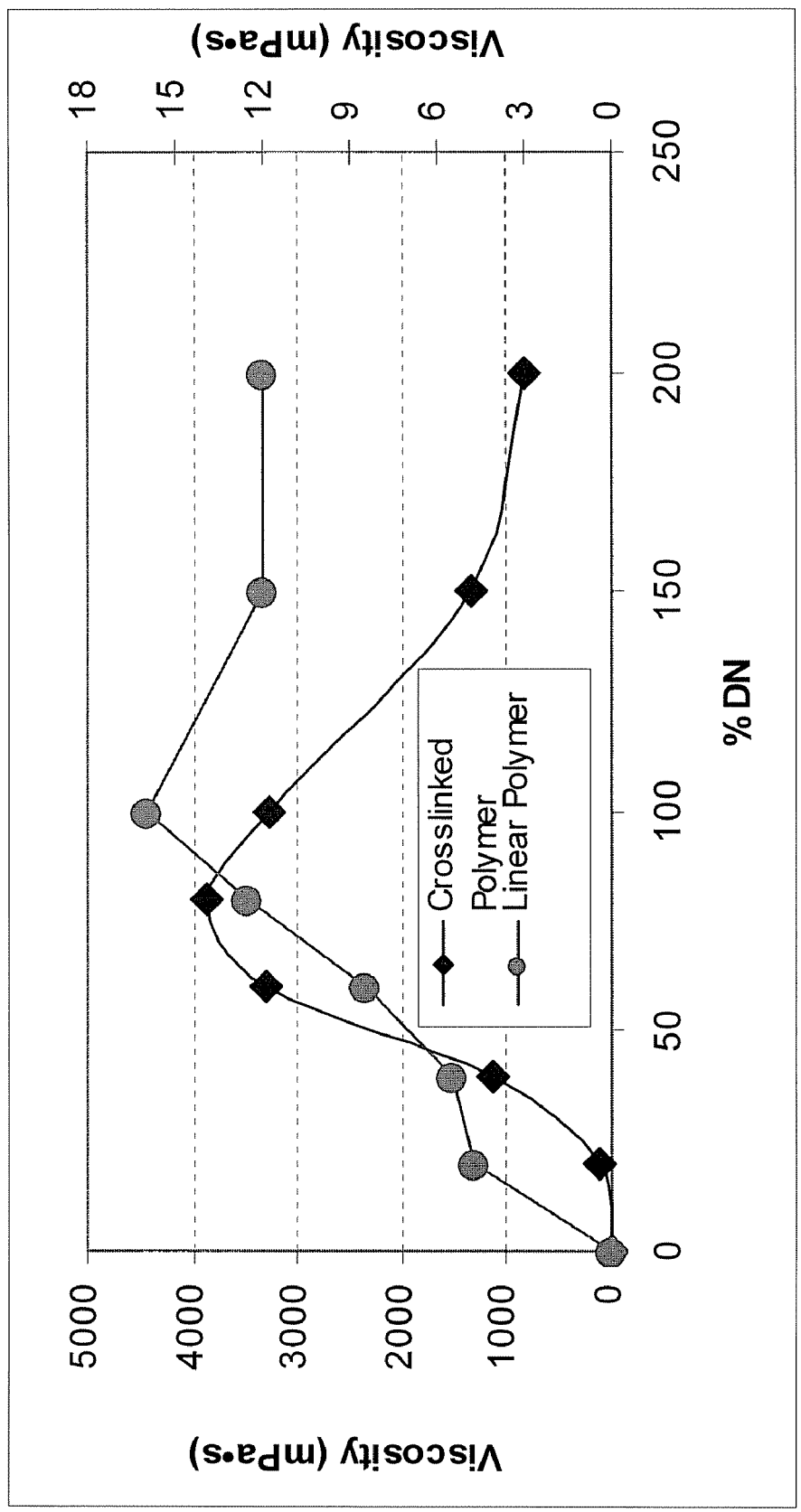
FIG. 4 is a graph comparing viscosity curves for a crosslinked acrylic based polymer and a polymer embodiment of the invention at varying degrees of neutralization. The left hand vertical axis depicts viscosity values for the crosslinked acrylic based polymer and the right hand vertical axis depicts viscosity values for a polymer embodiment of the invention.

Viscosities of the non-crosslinked, linear polymer of Example 7 and the crosslinked commercially available polymer, Carbopol® Aqua SF-1, are measured at increasing degrees of polymer neutralization. Several mucilages of each polymer (1 wt. % polymer solids in deionized water) are prepared. Mucilages of each polymer are neutralized to 20, 40, 60, 80 and 100% DN. Mucilage samples of each polymer are also neutralized to 150 and 200% DN. The polymer samples are neutralized with an 18% NaOH solution (the amount of NaOH employed is calculated on the basis of acid number of the polymer). The viscosity of each mucilage sample is measured after 24 hours using the viscosity procedure described above. The results are plotted in FIG. 4.

What is claimed is:

1. A method for increasing the critical micelle concentration of a surfactant composition comprising a linear hydrophobically modified (meth)acrylic polymer, said method comprises neutralizing said polymer in said surfactant composition to a degree of neutralization ranging from about 1 to about 50% based on the acid number of said polymer and wherein a 3 wt. % mucilage of said polymer in deionized water neutralized with an 18% solution of NaOH to about pH 7 has a yield value of 0 and a Brookfield viscosity of less than 1000 mPa·s (Brookfield RVT, 20 rpm, spindle No. 1) at a temperature range of 20 to 25° C.

2. A method of claim 1 wherein said degree of neutralization ranges from about 5 to about 40% based on the acid number of said polymer.

3. A method of claim 1 wherein said degree of neutralization ranges from about 15 to about 30% based on the acid number of said polymer.

4. A method of claim 1 wherein said linear polymer is polymerized from a monomer composition comprising at least one monounsaturated carboxylic acid containing monomer and at least one hydrophobically modified, ethylenically unsaturated comonomer represented by the formula:

wherein R is selected from hydrogen and methyl; X is selected from —C(O)OR$^1$ and —OC(O)R$^2$; R$^1$ is selected from linear and branched C$_1$ to C$_9$ alkyl; and R$^2$ is selected from hydrogen and linear or branched C$_1$ to C$_9$ alkyl.

5. A method of claim 4 wherein said linear polymer is polymerized from a monomer composition comprising at least one of (meth)acrylic acid, itaconic acid, citraconic acid, maleic acid, fumaric acid, crotonic acid, aconitic acid; anhydrides thereof; monoesters of C$_1$ to C$_{30}$ alkanols thereof; and mixtures thereof.

6. A method of claim 5 wherein said at least one hydrophobically modified, ethylenically unsaturated comonomer is selected from ethyl (meth)acrylate, butyl (meth)acrylate, 2-ethylhexyl (meth)acrylate, vinyl formate, vinyl acetate, 1-methylvinyl acetate, vinyl propionate, vinyl butyrate, vinyl 2-ethylhexanoate, vinyl pivalate, vinyl neodecanoate, and mixtures thereof.

7. A method of claim 6 wherein said linear polymer has a molecular weight of 100,000 M$_n$ or less.

8. A method of claim 4 wherein said a hydrophobically modified ethylenically unsaturated monomer is selected from a C$_1$ to C$_9$ alkyl(meth)acrylate, and wherein said polymer has a molecular weight of 100,000 Mn or less as measured by GPC calibrated with a PMMA standard and a Brookfield viscosity of 500 mPa·s or less (Brookfield RVT, 20 rpm, spindle No. 1) at a 5 wt. % polymer solids concentration in deionized water neutralized to pH 7 with an 18 wt. % NaOH solution.

9. A method for increasing the critical micelle concentration of a household care, pet care, animal care, industrial and institutional care detersive composition comprising a surfactant and a linear hydrophobically modified (meth)acrylic polymer, said method comprises neutralizing said polymer in said surfactant composition to a degree of neutralization ranging from about 1 to about 50% based on the acid number of said polymer and wherein a 3 wt. % mucilage of said polymer in deionized water neutralized with an 18% solution of NaOH to about pH 7 has a yield value of 0 and a Brookfield viscosity of less than 1000 mPa·s (Brookfield RVT, 20 rpm, spindle No. 1) at a temperature range of 20 to 25° C.

10. A method of claim 9 wherein said degree of neutralization ranges from about 5 to about 40% based on the acid number of said polymer.

11. A method of claim 9 wherein said degree of neutralization ranges from about 15 to about 30% based on the acid number of said polymer.

12. A method of claim 9 wherein said linear polymer is polymerized from a monomer composition comprising at least one monounsaturated carboxylic acid containing monomer and at least one hydrophobically modified, ethylenically unsaturated comonomer represented by the formula:

$$CH_2=CRX$$

wherein R is selected from hydrogen and methyl; X is selected from $-C(O)OR^1$ and $-OC(O)R^2$; $R^1$ is selected from linear and branched $C_1$ to $C_9$ alkyl; and $R^2$ is selected from hydrogen and linear or branched $C_1$ to $C_9$ alkyl.

13. A method of claim 12 wherein said linear polymer is polymerized from a monomer composition comprising at least one of (meth)acrylic acid, itaconic acid, citraconic acid, maleic acid, fumaric acid, crotonic acid, aconitic acid; anhydrides thereof; monoesters of $C_1$ to $C_{30}$ alkanols thereof; and mixtures thereof.

14. A method of claim 13 wherein said at least one hydrophobically modified, ethylenically unsaturated comonomer is selected from ethyl (meth)acrylate, butyl (meth)acrylate, 2-ethylhexyl (meth)acrylate, vinyl formate, vinyl acetate, 1-methylvinyl acetate, vinyl propionate, vinyl butyrate, vinyl 2-ethylhexanoate, vinyl pivalate, vinyl neodecanoate, and mixtures thereof.

15. A method of claim 14 wherein said linear polymer has a molecular weight of 100,000 $M_n$ or less.

16. A method of claim 9 wherein said surfactant is selected from anionic surfactant(s), cationic surfactant(s), amphoteric surfactant(s), nonionic surfactant(s), and mixtures thereof.

* * * * *